United States Patent
Kato

(10) Patent No.: US 7,933,694 B2
(45) Date of Patent: Apr. 26, 2011

(54) POWER SUPPLY SYSTEM AND VEHICLE INCLUDING THE SAME, AND METHOD OF CONTROLLING POWER SUPPLY SYSTEM

(75) Inventor: Norihiko Kato, Kariya (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 15 days.

(21) Appl. No.: 12/582,929

(22) Filed: Oct. 21, 2009

(65) Prior Publication Data

US 2010/0100264 A1   Apr. 22, 2010

(30) Foreign Application Priority Data

Oct. 21, 2008   (JP) .................................. 2008-271209

(51) Int. Cl.
*B60L 9/00*   (2006.01)
*B60L 11/00*   (2006.01)

(52) U.S. Cl. ............. 701/22; 307/10.1; 307/29; 307/82; 180/65.22; 320/135

(58) Field of Classification Search .................... 307/29, 307/10.1, 82, 10.7; 701/22; 320/134–136, 320/109, 164, 162; 180/65.1, 65.2, 65.22, 180/65.31; 903/903; 318/803
See application file for complete search history.

(56) References Cited

U.S. PATENT DOCUMENTS

| | | | | |
|---|---|---|---|---|
| 6,480,767 B2* | 11/2002 | Yamaguchi et al. | ............ | 701/22 |
| 6,819,985 B2* | 11/2004 | Minagawa et al. | ............. | 701/22 |
| 7,013,205 B1* | 3/2006 | Hafner et al. | ................... | 701/22 |
| 7,136,727 B2* | 11/2006 | Seo et al. | ......................... | 701/22 |
| 7,340,330 B2* | 3/2008 | Okoshi et al. | .................... | 701/22 |
| 7,607,499 B2* | 10/2009 | Egami | ...................... | 180/65.265 |
| 7,719,232 B2* | 5/2010 | Kelty et al. | .................... | 320/132 |
| 7,849,944 B2* | 12/2010 | DeVault | ...................... | 180/65.29 |
| 2002/0062183 A1* | 5/2002 | Yamaguchi et al. | ............ | 701/22 |
| 2002/0116099 A1* | 8/2002 | Tabata et al. | .................... | 701/22 |
| 2004/0158365 A1* | 8/2004 | Tabata et al. | .................... | 701/22 |

(Continued)

FOREIGN PATENT DOCUMENTS

CN   101741115 A   *   6/2010

(Continued)

OTHER PUBLICATIONS

Silicon-on-insulator based high-temperature electronics for automotive applications; Huque, M.A. et al.; Industrial Electronics, 2008. ISIE 2008. IEEE International Symposium on; Digital Object Identifier: 10.1109/ISIE.2008.4677170; Publication Year: 2008 , pp. 2538-2543.*

(Continued)

*Primary Examiner* — Cuong H Nguyen
(74) *Attorney, Agent, or Firm* — Gifford, Krass, Sprinkle, Anderson & Citkowski, P.C.

(57) ABSTRACT

A CD mode electric power allocation ratio calculation unit calculates an electric power allocation ratio between a first power storage device and a power storage device connected to a second converter by means of a switching device, to be used during a CD mode, based on a remaining electric power amount of each power storage device. A CS mode electric power allocation ratio calculation unit calculates a deviation amount between SOC of each of the first power storage device and the power storage device connected to the second converter and a target value thereof, and calculates an electric power allocation ratio to be used during a CS mode, based on the calculated deviation amount.

17 Claims, 13 Drawing Sheets

U.S. PATENT DOCUMENTS

| | | | | |
|---|---|---|---|---|
| 2005/0082097 A1 | * | 4/2005 | Ichimoto et al. | 180/65.2 |
| 2010/0038962 A1 | | 2/2010 | Komatsu | |
| 2010/0106351 A1 | * | 4/2010 | Hanssen et al. | 701/22 |

FOREIGN PATENT DOCUMENTS

| | | | | |
|---|---|---|---|---|
| JP | 2007082640 A | | | 3/2007 |
| JP | 2008109840 A | | | 5/2008 |
| JP | 2008167620 A | | | 7/2008 |
| JP | 2008219964 A | * | | 9/2008 |
| JP | 2009261183 A | * | | 11/2009 |
| JP | 2010104096 A | * | | 5/2010 |
| JP | 2010104129 A | * | | 5/2010 |
| WO | WO 03045724 A2 | * | | 6/2003 |

OTHER PUBLICATIONS

Steady state analysis of two stage converter combined with coupling capacitor; Otsu, S.; Sato, T.; Nabeshima, T.; Nishijima, K.; Telecommunications Energy Conference, 2009. INTELEC 2009. 31st International; Digital Object Identifier: 10.1109/INTLEC.2009.5351915; Publication Year: 2009 , pp. 1-5.*

Techniques to Control the Electricity Generation in a Series Hybrid Electrical Vehicle; Barsali, S.; Ceraolo, M.; Possenti, A.; Power Engineering Review, IEEE; vol. 22 , Issue: 4; Digital Object Identifier: 10.1109/MPER.2002.4312126 Publication Year: 2002 , pp. 74.*

A Fully Differential Comparator-Based Switched-Capacitor Modulator; Mu-Chen Huang; Shen-Iuan Liu; Circuits and Systems II: Express Briefs, IEEE Transactions on; vol. 56 , Issue: 5; Digital Object Identifier: 10.1109/TCSII.2009.2019166 Publication Year: 2009 , pp. 369-373.*

High Efficiency Energy Storage System Design for Hybrid Electric Vehicle with Motor Drive Integration; Shuai Lu et al.; Ferdowsi, M.; Industry Applications Conference, 2006. 41st IAS Annual Meeting. Conference Record of the 2006 IEEE; vol. 5; Digital Object Identifier: 10.1109/IAS.2006.256899; Publication Year: 2006 , pp. 2560-2567.*

Common-Mode Modeling of the Association of $N$ -Switching Cells: Application to an Electric-Vehicle-Drive System Labrousse, D.; Revol, B.; Costa, F.; Power Electronics, IEEE Transactions on; vol. 25 , Issue: 11; Digital Object Identifier: 10.1109/TPEL.2010.2051457; Publication Year: 2010 , pp. 2852-2859.*

A nine-switch three-level inverter for electric vehicle applications; Mingyan Wang; Kai Tian; Vehicle Power and Propulsion Conference, 2008. VPPC '08. IEEE ; Digital Object Identifier: 10.1109/VPPC.2008.4677649; Publication Year: 2008 , pp. 1-5.*

Efficiency modeling and comparison of switched capacitor, Luo, and interleaved switched capacitor converters for electric vehicle Energy storage systems; Amjadi, Zahra; Williamson, Sheldon S.; IECON 2010—36th Annual Conference on IEEE Industrial Electronics Society; Digital Object Identifier: 10.1109/IECON.2010.5675402; Publication Year: 2010.*

* cited by examiner

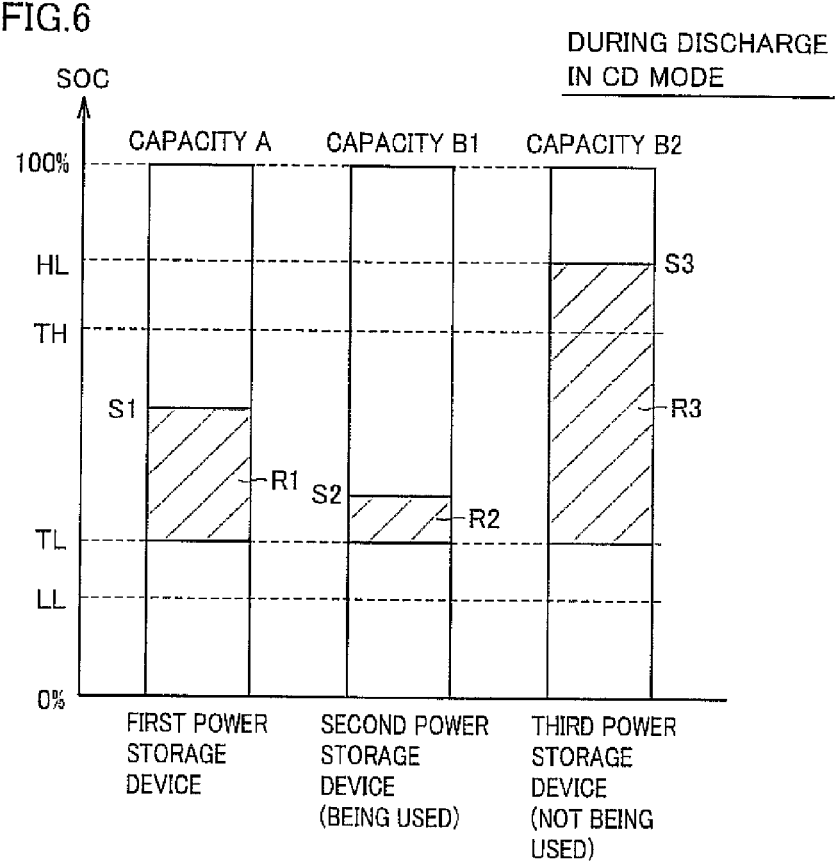
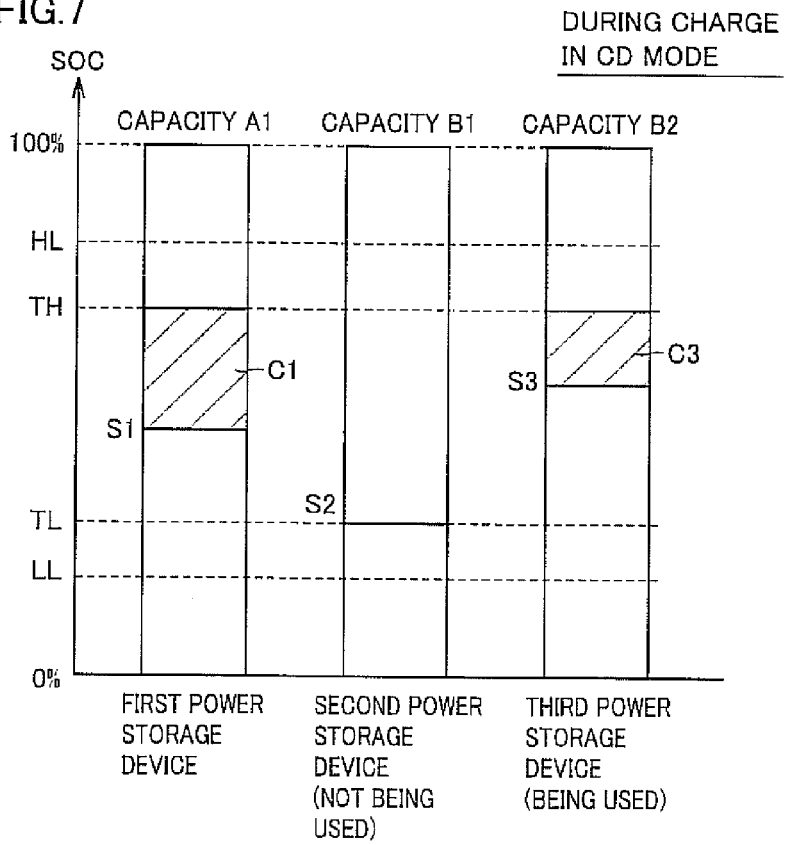

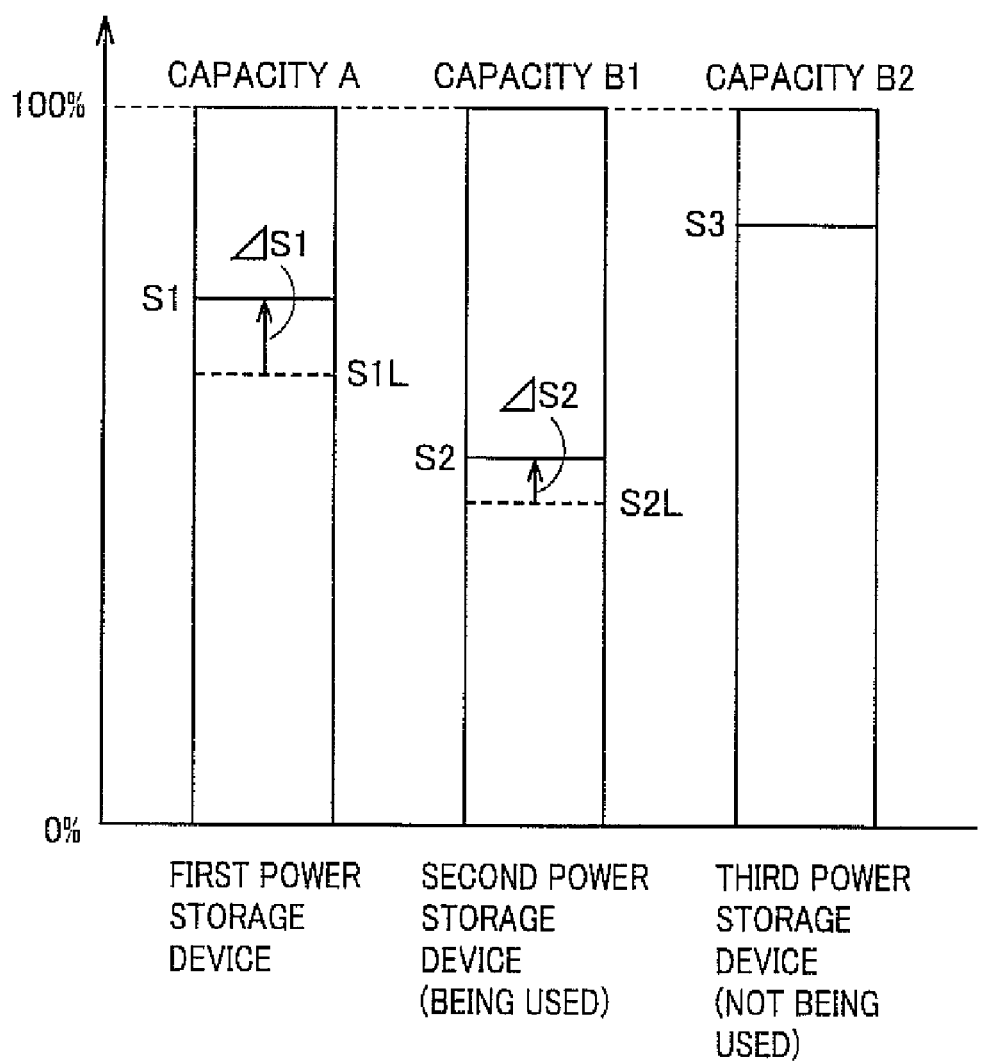

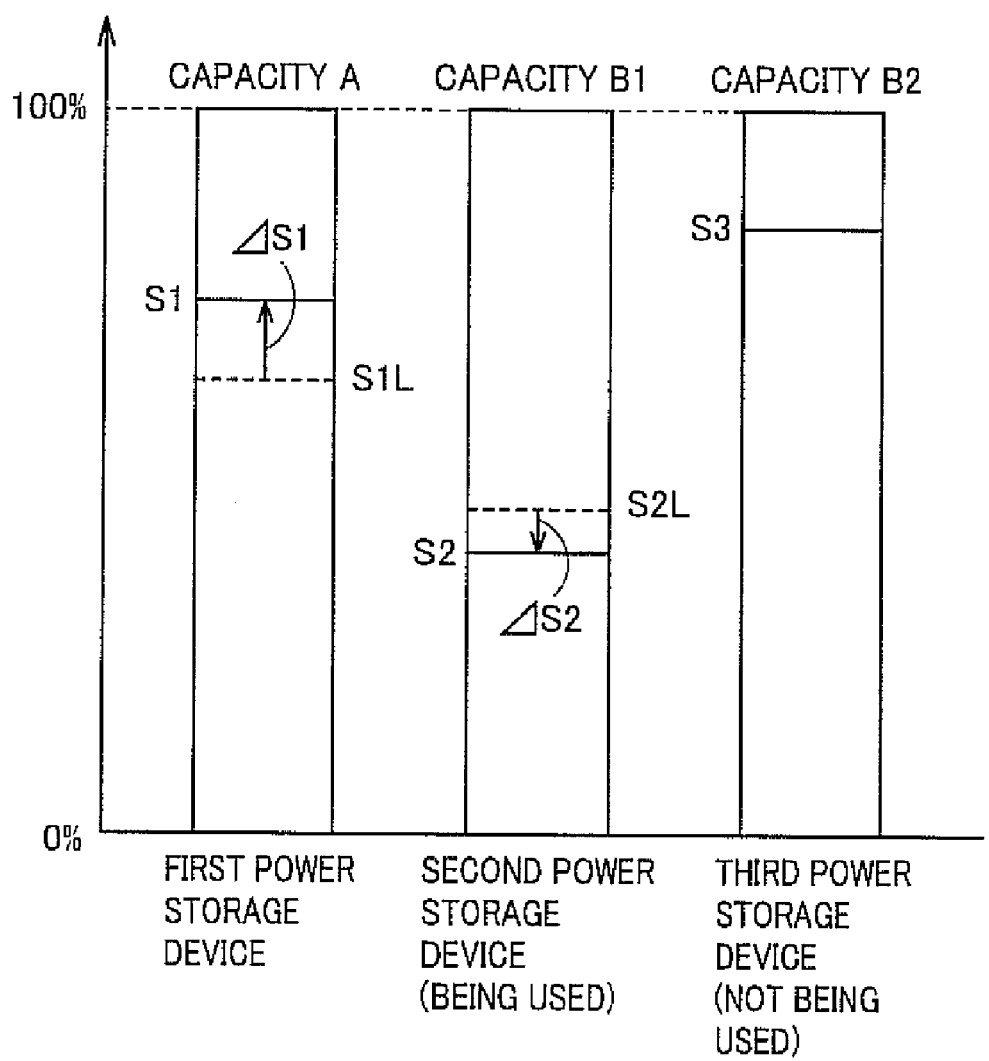

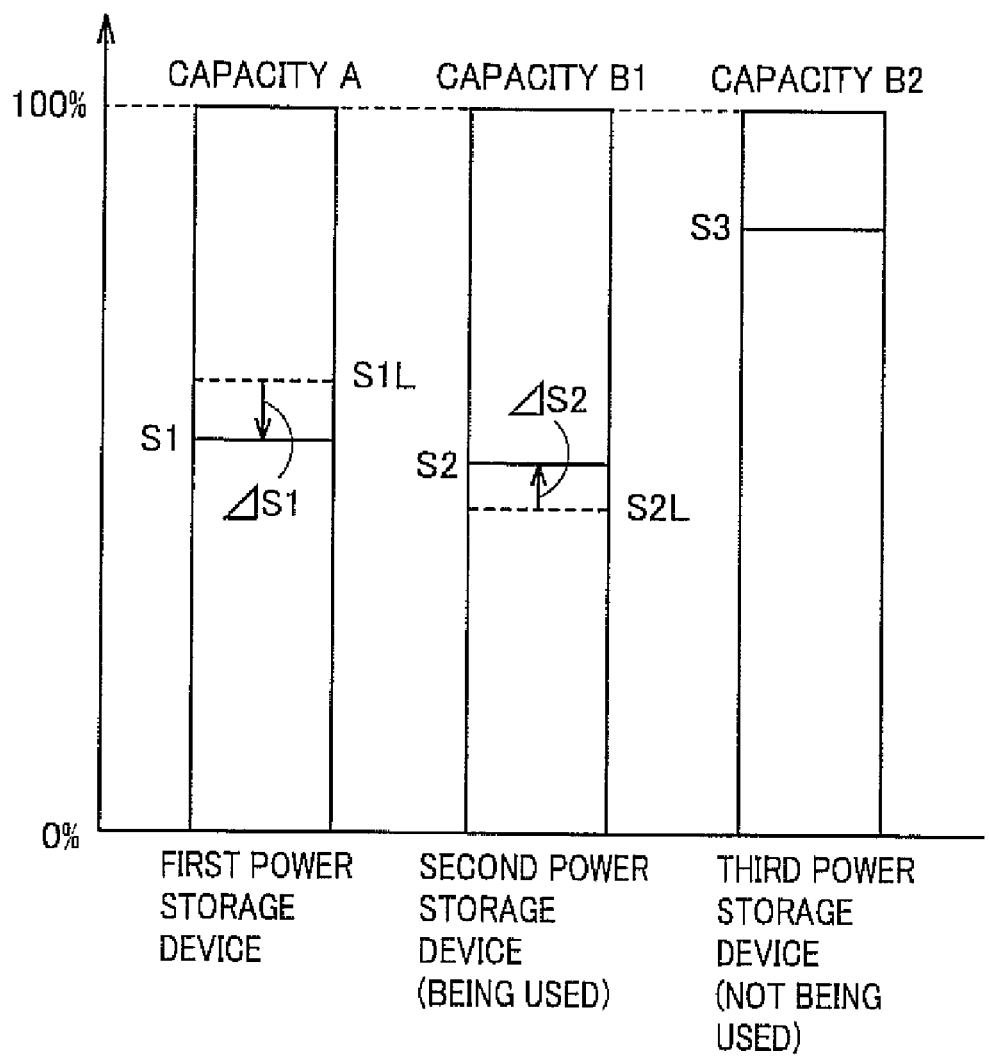

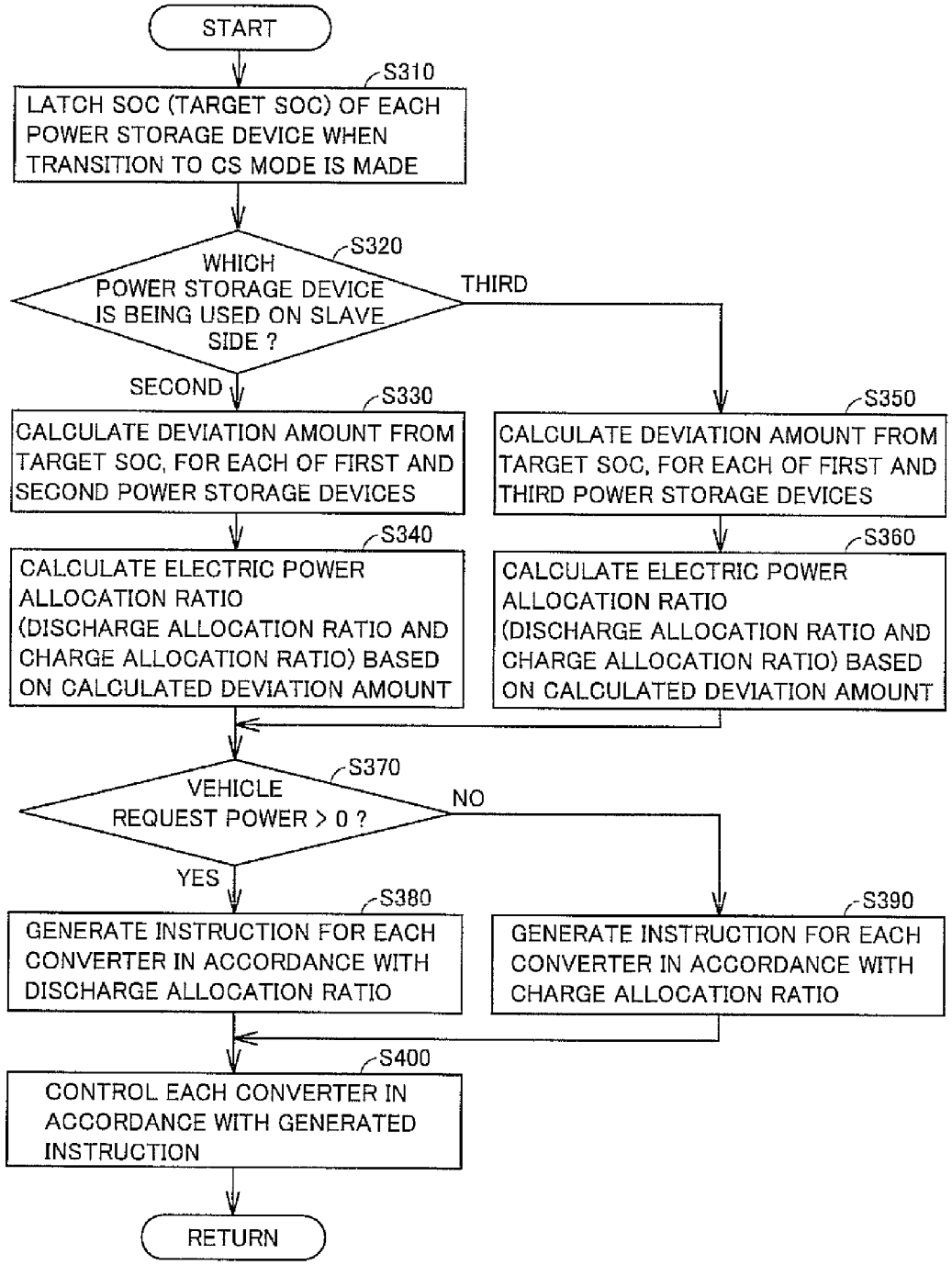

POWER SUPPLY SYSTEM AND VEHICLE INCLUDING THE SAME, AND METHOD OF CONTROLLING POWER SUPPLY SYSTEM

This nonprovisional application is based on Japanese Patent Application No. 2008-271209 filed with the Japan Patent Office on Oct. 21, 2008, the entire contents of which are hereby incorporated by reference.

BACKGROUND OF THE INVENTION

1. Field of the Invention

The present invention relates to charge and discharge control in a power supply system including a plurality of power storage devices.

2. Description of the Background Art

A hybrid vehicle capable of running using at least one of an internal combustion engine and a motor that operates upon receiving electric power from a rechargeable power storage device, in which the power storage device is chargeable by a power generation device generating electric power by using outputs from the internal combustion engine, has been known. Among such hybrid vehicles, a vehicle that can run by switching between a running mode in which the vehicle mainly runs only with a motor by using electric power stored in the power storage device for running without maintaining the same (referred to as a "CD (Charge Depleting) mode," an "EV (Electric Vehicle) mode" or the like, and hereinafter referred to as the "CD mode") and a running mode in which the vehicle runs while maintaining electric power stored in the power storage device at a prescribed target (referred to as a "CS (Charge Sustaining) mode," an "HV (Hybrid Vehicle) mode" or the like, and hereinafter referred to as the "CS mode") has also been known.

Regarding a power supply system mounted on such a hybrid vehicle, Japanese Patent Laying-Open No. 2008-109840 discloses a power supply system including a plurality of power storage devices. In this power supply system, a remaining electric power amount down to SOC at which allowable discharge electric power that can be output from the power storage device is to be restricted is calculated for each power storage device, and a discharge allocation ratio of the power storage device is calculated in accordance with a ratio of the remaining electric power amount. In addition, a charge acceptable amount up to SOC at which acceptable charge electric power that can be input to the power storage device is to be restricted is calculated for each power storage device, and a charge allocation ratio of the power storage device is calculated in accordance with a ratio of the charge acceptable amount. When electric power is supplied from the power supply system to a drive force generation portion, each converter is controlled in accordance with the discharge allocation ratio, and when electric power is supplied from the drive force generation portion to the power supply system, each converter is controlled in accordance with the charge allocation ratio.

According to this power supply system, even when charge and discharge characteristics of a plurality of power storage devices are different among them, performance of the system can be exhibited to its maximum.

As a method of managing electric power is different between a case where a running mode is set to the CD mode and a case where a running mode is set to the CS mode as described above, it is necessary to achieve appropriate electric power allocation in accordance with the running mode. If this electric power allocation is inappropriate, any power storage device among the plurality of power storage devices reaches discharge limit or charge limit earlier than other power storage devices and thereafter maximum discharge characteristics or charge characteristics as the whole power supply system cannot be obtained. Japanese Patent Laying-Open No. 2008-109840 above does not particularly address specific electric power allocation in accordance with the running mode (CD mode/CS mode).

SUMMARY OF THE INVENTION

Therefore, an object of the present invention is to achieve appropriate electric power allocation in accordance with a running mode in a power supply system including a plurality of power storage devices, that is mounted on a vehicle capable of running while switching between the CD mode and the CS mode.

According to the present invention, a power supply system is a power supply system mounted on a vehicle capable of running while switching between a first running mode (CD mode) of running using electric power stored for running without maintaining the electric power and a second running mode (CS mode) of running while maintaining the electric power at a prescribed target, and the power supply system includes a power line, first and second converters, a first rechargeable power storage device, a plurality of second rechargeable power storage devices, a switching device, and a control device. The power line is provided for supplying and receiving electric power between a drive force generation portion for generating drive force for running upon receiving electric power from the power supply system and the power supply system. The first and second converters are connected in parallel to the power line. The first power storage device is connected to the first converter. The switching device is provided between the plurality of second power storage devices and the second converter and configured to connect any of the plurality of second power storage devices to the second converter in accordance with a provided instruction. The control device controls the first and second converters and the switching device. Here, the control device includes a switching control unit, first and second electric power allocation ratio calculation units, and a converter control unit. When a state quantity (SOC) indicating a charged state of the second power storage device connected to the second converter is lower than a predetermined value, the switching control unit generates the instruction for sequentially switching for use the plurality of second power storage devices such that a remaining second power storage device, of which state quantity is not lower than the predetermined value, is connected to the second converter, and outputs the instruction to the switching device. The first electric power allocation ratio calculation unit calculates, based on a remaining electric power amount of each of the first power storage device and the plurality of second power storage devices, a first electric power allocation ratio indicating a ratio of allocation of charge and discharge electric power between the first power storage device and the second power storage device connected to the second converter by means of the switching device, that is to be used during the first running mode (CD mode). The second electric power allocation ratio calculation unit calculates, based on a difference between the state quantity in each of the first power storage device and the second power storage device connected to the second converter by means of the switching device and a target value thereof, a second electric power allocation ratio indicating a ratio of allocation of charge and discharge electric power between the first power storage device and the second power storage device connected to the second converter, to be used during the second running mode (CS mode). The converter control unit controls the first and second converters in accordance with the first electric power allocation ratio during the first running mode and controls the first and second converters in accordance with the second electric power allocation ratio during the second running mode.

Preferably, the target value of the first power storage device is set to the state quantity of the first power storage device attained when transition from the first running mode to the second running mode is made. The target value of the second power storage device connected to the second converter by means of the switching device is set to the state quantity of the second power storage device attained when transition from the first running mode to the second running mode is made.

Preferably, when a first value obtained by subtracting the target value of the state quantity of the first power storage device from the state quantity has a positive value and a second value obtained by subtracting the target value of the state quantity of the second power storage device connected to the second converter by means of the switching device from the state quantity has a positive value, the second electric power allocation ratio calculation unit calculates the second electric power allocation ratio such that the first power storage device and the second power storage device connected to the second converter discharge in accordance with a ratio between the first value and the second value when electric power is supplied from the power supply system to the drive force generation portion, and calculates the second electric power allocation ratio such that the first power storage device and the second power storage device connected to the second converter are charged in accordance with an inverse ratio between the first value and the second value when electric power is supplied from the drive force generation portion to the power supply system.

Alternatively, preferably, when a first value obtained by subtracting the target value of the state quantity of the first power storage device from the state quantity has a negative value and a second value obtained by subtracting the target value of the state quantity of the second power storage device connected to the second converter by means of the switching device from the state quantity has a negative value, the second electric power allocation ratio calculation unit calculates the second electric power allocation ratio such that the first power storage device and the second power storage device connected to the second converter are charged in accordance with a ratio between the first value and the second value when electric power is supplied from the drive force generation portion to the power supply system, and calculates the second electric power allocation ratio such that the first power storage device and the second power storage device connected to the second converter discharge in accordance with an inverse ratio between the first value and the second value when electric power is supplied from the power supply system to the drive force generation portion.

Alternatively, preferably, when a value obtained by subtracting the target value of the state quantity of the first power storage device from the state quantity has a positive value and a value obtained by subtracting the target value of the state quantity of the second power storage device connected to the second converter by means of the switching device from the state quantity has a negative value, the second electric power allocation ratio calculation unit calculates the second electric power allocation ratio such that the first power storage device alone discharges when electric power is supplied from the power supply system to the drive force generation portion, and calculates the second electric power allocation ratio such that the second power storage device alone connected to the second converter is charged when electric power is supplied from the drive force generation portion to the power supply system.

Alternatively, preferably, when a value obtained by subtracting the target value of the state quantity of the first power storage device from the state quantity has a negative value and a value obtained by subtracting the target value of the state quantity of the second power storage device connected to the second converter by means of the switching device from the state quantity has a positive value, the second electric power allocation ratio calculation unit calculates the second electric power allocation ratio such that the second power storage device alone connected to the second converter discharges when electric power is supplied from the power supply system to the drive force generation portion, and calculates the second electric power allocation ratio such that the first power storage device alone is charged when electric power is supplied from the drive force generation portion to the power supply system.

Preferably, the converter control unit includes first and second control units. The first control unit controls the first converter such that a voltage on the power line is adjusted to a prescribed target voltage. The second control unit controls the second converter such that charge and discharge of the second power storage device connected to the second converter is adjusted to a prescribed target amount.

Preferably, the switching device includes a plurality of relays. The plurality of relays are connected between respective ones of the plurality of second power storage devices and the second converter.

Preferably, the power supply system further includes a charger. The charger is provided for charging the first power storage device and the plurality of second power storage devices upon receiving electric power from a power supply outside the vehicle.

In addition, according to the present invention, a vehicle includes any power supply system described above and a drive force generation portion for generating drive force of the vehicle upon receiving electric power from the power supply system.

In addition, according to the present invention, a method of controlling a power supply system is a method of controlling a power supply system mounted on a vehicle capable of running while switching between a first running mode (CD mode) of running using electric power stored for running without maintaining the electric power and a second running mode (CS mode) of running while maintaining the electric power at a prescribed target. The power supply system includes a power line, first and second converters, a first rechargeable power storage device, a plurality of second rechargeable power storage devices, and a switching device. The power line is provided for supplying and receiving electric power between a drive force generation portion for generating drive force for running upon receiving electric power from the power supply system and the power supply system. The first and second converters are connected in parallel to the power line. The first power storage device is connected to the first converter. The switching device is provided between the plurality of second power storage devices and the second converter and configured to connect any of the plurality of second power storage devices to the second converter in accordance with a provided instruction. The control method includes the steps of: controlling the switching device such that, when a state quantity (SOC) indicating a charged state of the second power storage device connected to the second converter is lower than a predetermined value, a remaining second power storage device of which state quantity is not lower than the predetermined value is connected to the second converter; calculating, based on a remaining electric power amount of each of the first power storage device and the plurality of second power storage devices, a first electric power allocation ratio indicating a ratio of allocation of charge and discharge electric power between the first power storage device and the second power storage device connected to the second converter by means of the switching device, that is to be used during the first running mode (CD mode); calculating, based on a difference between the state quantity in each of the first power storage device and the second power storage device connected to the second converter by means of the switching device and a target value thereof, a second electric power allocation ratio indicating a ratio of allocation of charge and discharge electric power between the first power storage device and the second power storage device connected to the second converter, to be used during the second running mode (CS mode); and controlling the first and second converters in accordance with the first electric power allocation ratio during the first running mode and controlling the first and second converters in accordance with the second electric power allocation ratio during the second running mode.

Preferably, the target value of the first power storage device is set to the state quantity of the first power storage device attained when transition from the first running mode to the second running mode is made. The target value of the second power storage device connected to the second converter by means of the switching device is set to the state quantity of the second power storage device attained when transition from the first running mode to the second running mode is made.

Preferably, in the step of calculating a second electric power allocation ratio, when a first value obtained by subtracting the target value of the state quantity of the first power storage device from the state quantity has a positive value and a second value obtained by subtracting the target value of the state quantity of the second power storage device connected to the second converter by means of the switching device from the state quantity has a positive value, the second electric power allocation ratio is calculated such that the first power storage device and the second power storage device connected to the second converter discharge in accordance with a ratio between the first value and the second value when electric power is supplied from the power supply system to the drive force generation portion, and the second electric power allocation ratio is calculated such that the first power storage device and the second power storage device connected to the second converter are charged in accordance with an inverse ratio between the first value and the second value when electric power is supplied from the drive force generation portion to the power supply system.

Alternatively, preferably, in the step of calculating a second electric power allocation ratio, when a first value obtained by subtracting the target value of the state quantity of the first power storage device from the state quantity has a negative value and a second value obtained by subtracting the target value of the state quantity of the second power storage device connected to the second converter by means of the switching device from the state quantity has a negative value, the second electric power allocation ratio is calculated such that the first power storage device and the second power storage device connected to the second converter are charged in accordance with a ratio between the first value and the second value when electric power is supplied from the drive force generation portion to the power supply system, and the second electric power allocation ratio is calculated such that the first power storage device and the second power storage device connected to the second converter discharge in accordance with an inverse ratio between the first value and the second value when electric power is supplied from the power supply system to the drive force generation portion.

Alternatively, preferably, in the step of calculating a second electric power allocation ratio, when a value obtained by subtracting the target value of the state quantity of the first power storage device from the state quantity has a positive value and a value obtained by subtracting the target value of the state quantity of the second power storage device connected to the second converter by means of the switching device from the state quantity has a negative value, the second electric power allocation ratio is calculated such that the first power storage device alone discharges when electric power is supplied from the power supply system to the drive force generation portion, and the second electric power allocation ratio is calculated such that the second power storage device alone connected to the second converter is charged when electric power is supplied from the drive force generation portion to the power supply system.

Alternatively, preferably, in the step of calculating a second electric power allocation ratio, when a value obtained by subtracting the target value of the state quantity of the first power storage device from the state quantity has a negative value and a value obtained by subtracting the target value of the state quantity of the second power storage device connected to the second converter by means of the switching device from the state quantity has a positive value, the second electric power allocation ratio is calculated such that the second power storage device alone connected to the second converter discharges when electric power is supplied from the power supply system to the drive force generation portion, and the second electric power allocation ratio is calculated such that the first power storage device alone is charged when electric power is supplied from the drive force generation portion to the power supply system.

Preferably, in the step of controlling the first and second converters, the first converter is controlled such that a voltage on the power line is adjusted to a prescribed target voltage, and the second converter is controlled such that charge and discharge of the second power storage device connected to the second converter is adjusted to a prescribed target amount.

According to the present invention, when the state quantity (SOC) of the second power storage device connected to the second converter is lower than the predetermined value, the remaining second power storage device of which state quantity is not lower than the predetermined value is connected to the second converter, and the plurality of second power storage devices are sequentially switched for use. During the first running mode (CD mode), the first electric power allocation ratio is calculated based on the remaining electric power amount of each of the first power storage device and the plurality of second power storage devices, and the first and second converters are controlled in accordance with the calculated first electric power allocation ratio. Thus, a case where any of the first power storage device and the plurality of second power storage devices sequentially switched for use reaches the discharge limit earlier than the other can be suppressed. Here, during the second running mode (CS mode), the second electric power allocation ratio is calculated based on the difference (deviation amount) between the state quantity in each of the first power storage device and the second power storage device connected to the second converter by means of the switching device and the target value thereof, and the first and second converters are controlled in accordance with the calculated second electric power allocation ratio. Thus, the state quantity (SOC) during the second running mode is maintained, and a case where any of the first power storage device and the plurality of second power storage devices sequentially switched for use reaches the discharge limit earlier than the other can be suppressed also after returning from the second running mode to the first running mode.

Therefore, according to the present invention, capability of a power supply system mounted on a vehicle capable of running while switching between running modes (CD mode/CS mode) can be exhibited to its maximum.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a diagram for illustrating a method of calculation of an electric power allocation ratio (during discharge) by a CD mode electric power allocation ratio calculation unit shown in FIG. 5.

FIG. 7 is a diagram for illustrating a method of calculation of an electric power allocation ratio (during charge) by the CD mode electric power allocation ratio calculation unit shown in FIG. 5.

FIG. 8 is a first diagram for illustrating a method of calculation of an electric power allocation ratio by a CS mode electric power allocation ratio calculation unit shown in FIG. 5.

FIG. 9 is a second diagram for illustrating a method of calculation of an electric power allocation ratio by the CS mode electric power allocation ratio calculation unit shown in FIG. 5.

FIG. 10 is a third diagram for illustrating a method of calculation of an electric power allocation ratio by the CS mode electric power allocation ratio calculation unit shown in FIG. 5.

FIG. 15 is a flowchart for illustrating a structure of a sub routine for controlling CS mode electric power allocation shown in FIG. 13.

DESCRIPTION OF THE PREFERRED EMBODIMENTS

Figure 1:
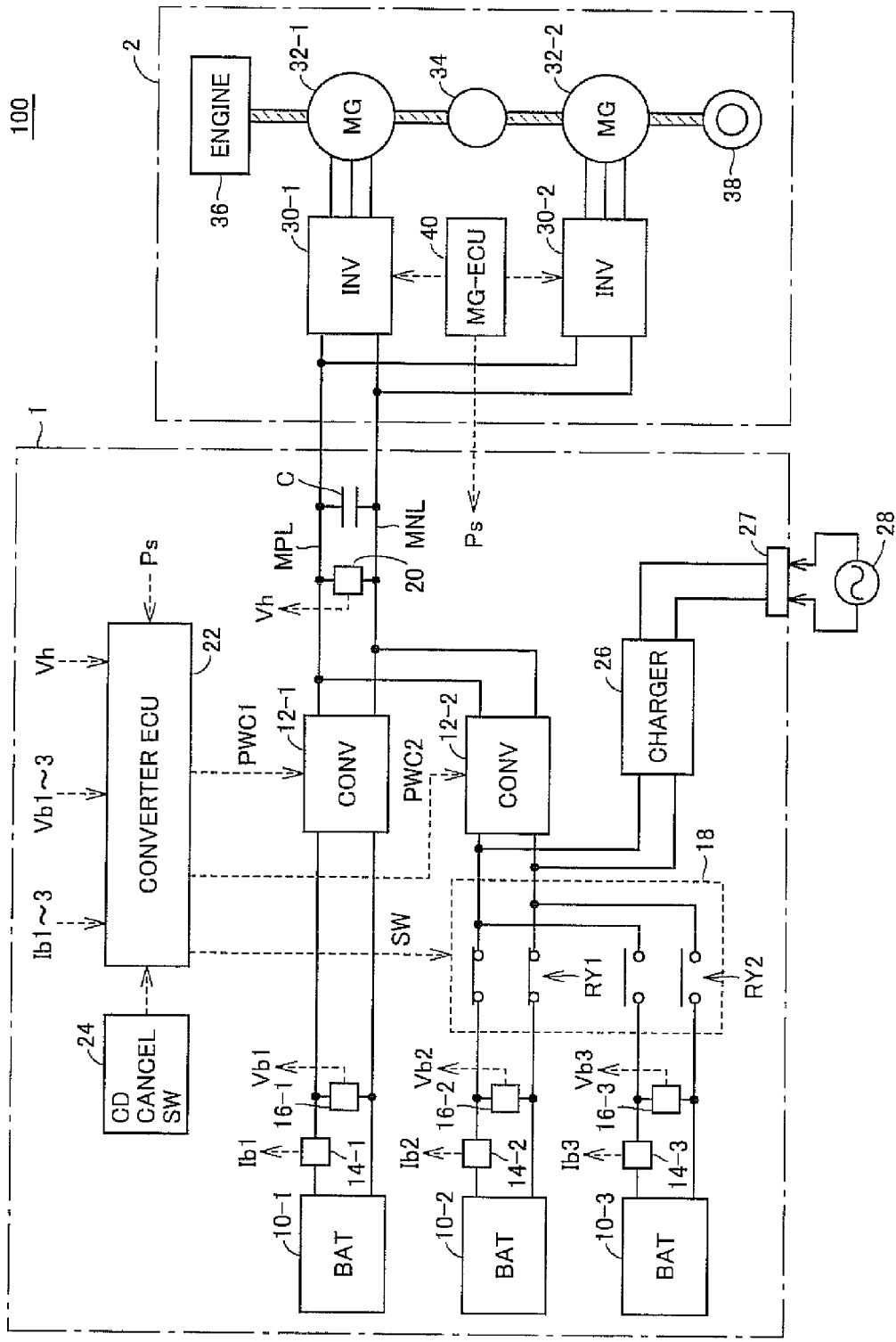
FIG. 1 is an overall block diagram of a vehicle incorporating a power supply system according to an embodiment of the present invention.

An embodiment of the present invention will be described hereinafter in detail with reference to the drawings. In the drawings, the same or corresponding elements have the same reference characters allotted, and description thereof will not be repeated.

FIG. 1 is an overall block diagram of a vehicle incorporating a power supply system according to an embodiment of the present invention. Referring to FIG. 1, a vehicle 100 includes a power supply system 1 and a drive force generation portion 2. Drive force generation portion 2 includes a first inverter 30-1, a second inverter 30-2, a first MG (Motor-Generator) 32-1, a second MG 32-2, a power split device 34, an engine 36, a driving wheel 38, and an MG-ECU (Electronic Control Unit) 40.

First MG 32-1, second MG 32-2, and engine 36 are coupled to power split device 34. Vehicle 100 runs by using drive force from at least one of engine 36 and second MG 32-2. Motive power generated by engine 36 is split into two paths by power split device 34. Namely, one is a path for transmission to driving wheel 38, and the other is a path for transmission to first MG 32-1.

Each of first MG 32-1 and second MG 32-2 is an AC rotating electric machine, and it is implemented, for example, by a three-phase AC rotating electric machine including a rotor having a permanent magnet embedded. First MG 32-1 generates electric power by using motive power from engine 36 split by power split device 34. For example, when SOC of the power storage device (which will be described later) included in power supply system 1 becomes lower, engine 36 is started, electric power is generated by first MG 32-1, and the generated electric power is supplied to power supply system 1.

Second MG 32-2 generates drive force by using at least one of electric power supplied from power supply system 1 and electric power generated by first MG 32-1. The drive force of second MG 32-2 is transmitted to driving wheel 38. During braking or the like of the vehicle, second MG 32-2 is driven by driving wheel 38, so that second MG 32-2 operates as a power generator. Thus, second MG 32-2 operates as a regenerative brake converting braking energy to electric power. Electric power generated by second MG 32-2 is supplied to power supply system 1.

Power split device 34 is constituted of a planetary gear including a sun gear, a pinion gear, a carrier, and a ring gear. The pinion gear is engaged with the sun gear and the ring gear. The carrier rotatably supports the pinion gear and it is coupled to a crankshaft of engine 36. The sun gear is coupled to a rotation shaft of first MG 32-1. The ring gear is coupled to a rotation shaft of second MG 32-2.

First inverter 30-1 and second inverter 30-2 are connected to a main positive bus MPL and a main negative bus MNL. First inverter 30-1 and second inverter 30-2 convert drive electric power (DC power) supplied from power supply system 1 to AC power and output the AC power to first MG 32-1 and second MG 32-2, respectively. In addition, first inverter 30-1 and second inverter 30-2 convert AC power generated by first MG 32-1 and second MG 32-2 into DC power and output the DC power to power supply system 1 as regenerative power.

Each of first inverter 30-1 and second inverter 30-2 is implemented, for example, by a bridge circuit including switching elements of three phases. Each inverter drives a corresponding MG by performing a switching operation in response to a drive signal from MG-ECU 40.

MG-ECU 40 calculates vehicle request power Ps based on a detection signal from each not-shown sensor, a running state, an accelerator position, and the like, and calculates a torque target value and a speed target value of first MG 32-1 and second MG 32-2 based on calculated vehicle request power Ps. In addition, MG-ECU 40 controls first inverter 30-1 and second inverter 30-2 such that generated torque and the speed of first MG 32-1 and second MG 32-2 attain to the target values. Moreover, MG-ECU 40 outputs calculated vehicle request power Ps to a converter ECU 22 (which will be described later) of power supply system 1. When vehicle request power Ps has a positive value, electric power is supplied from power supply system 1 to drive force generation portion 2, and when vehicle request power Ps has a negative value, regenerative power is supplied from drive force generation portion 2 to power supply system 1.

Meanwhile, power supply system 1 includes a first power storage device 10-1, a second power storage device 10-2, a third power storage device 10-3, a first converter 12-1, a second converter 12-2, a switching device 18, main positive bus MPL, main negative bus MNL, and a smoothing capacitor C. In addition, power supply system 1 further includes converter ECU 22, a CD cancel switch 24, current sensors 14-1 to 14-3, and voltage sensors 16-1 to 16-3 and 20. Moreover, power supply system 1 further includes a charger 26 and a vehicle inlet 27.

Each of first power storage device 10-1, second power storage device 10-2, and third power storage device 10-3 is a rechargeable DC power supply, and it is implemented, for example, by a secondary battery such as a nickel hydride battery or a lithium ion battery, a large-capacity capacitor, or the like. First power storage device 10-1 is connected to first converter 12-1, and second power storage device 10-2 and third power storage device 10-3 are connected to switching device 18.

Switching device 18 is provided between second and third power storage devices 10-2 and 10-3 and second converter 12-2, and it electrically connects any of second power storage device 10-2 and third power storage device 10-3 to second converter 12-2 in accordance with a switching signal SW from converter ECU 22. Specifically, switching device 18 includes system relays RY1 and RY2. System relay RY1 is disposed between second power storage device 10-2 and second converter 12-2. System relay RY2 is disposed between third power storage device 10-3 and second converter 12-2. For example, when switching signal SW is inactivated, system relays RY1 and RY2 are turned on and off respectively, and second power storage device 10-2 is electrically connected to second converter 12-2. When switching signal SW is activated, system relays RY1 and RY2 are turned off and on respectively, and third power storage device 10-3 is electrically connected to second converter 12-2. First converter 12-1 and second converter 12-2 are connected in parallel to main positive bus MPL and main negative bus MNL. First converter 12-1 converts a voltage between first power storage device 10-1 and main positive bus MPL, main negative bus MNL, based on a drive signal PWC1 from converter ECU 22. Second converter 12-2 converts a voltage between any of second power storage device 10-2 and third power storage device 10-3 electrically connected to second converter 12-2 by means of switching device 18 and main positive bus MPL, main negative bus MNL, based on a drive signal PWC2 from converter ECU 22.

Smoothing capacitor C is connected between main positive bus MPL and main negative bus MNL, and lowers an electric power fluctuation component included in main positive bus MPL and main negative bus MNL. Voltage sensor 20 detects a voltage Vh across main positive bus MPL and main negative bus MNL and outputs the detected value to converter ECU 22.

Current sensors 14-1 to 14-3 detect a current Ib1 input and output from/to first power storage device 10-1, a current Ib2 input and output from/to second power storage device 10-2, and a current Ib3 input and output from/to third power storage device 10-3, respectively, and output the detected values to converter ECU 22. Each of current sensors 14-1 to 14-3 detects a current output from a corresponding power storage device (discharge current) as a positive value and detects a current input to a corresponding power storage device (charging current) as a negative value. Though FIG. 1 shows an example where each of current sensors 14-1 to 14-3 detects a current through a positive electrode line, each of current sensors 14-1 to 14-3 may detect a current through a negative electrode line.

Voltage sensors 16-1 to 16-3 detect a voltage Vb1 of first power storage device 10-1, a voltage Vb2 of second power storage device 10-2, and a voltage Vb3 of third power storage device 10-3, respectively, and output the detected values to converter ECU 22.

Converter ECU 22 generates switching signal SW for sequentially switching for use between second power storage device 10-2 and third power storage device 10-3 connected to switching device 18 and outputs the signal to switching device 18. For example, when SOC of second power storage device 10-2 becomes lower than a predetermined value while second power storage device 10-2 is connected to second converter 12-2 by means of switching device 18, converter ECU 22 generates switching signal SW to turn off system relay RY1 in the ON state and turn on system relay RY2 in the OFF state.

In addition, converter ECU 22 generates drive signals PWC1 and PWC2 for driving first converter 12-1 and second converter 12-2 respectively, based on detection values from current sensors 14-1 to 14-3 and voltage sensors 16-1 to 16-3 and 20 as well as vehicle request power Ps from MG-ECU 40. Converter ECU 22 outputs generated drive signals PWC1 and PWC2 to first converter 12-1 and second converter 12-2, respectively, and controls first converter 12-1 and second converter 12-2.

Moreover, converter ECU 22 controls the running mode. Specifically, when each power storage device is charged by charger 26 as will be described later, converter ECU 22 sets, as the default running mode, the CD mode in which the vehicle runs by using electric power stored in each power storage device without maintaining that electric power. When a driver turns on CD cancel switch 24, the running mode is switched to the CS mode in which the vehicle runs while maintaining electric power stored in each power storage device. If SOC of each power storage device attains to a prescribed lower limit value, converter ECU 22 switches the running mode from the CD mode to the CS mode, even though CD cancel switch 24 is not turned on.

During the CD mode, unless large vehicle request power Ps is requested, engine 36 is stopped and the vehicle runs only with second MG 32-2, and hence electric power stored in each power storage device decreases. On the other hand, during the CS mode, engine 36 operates as appropriate and electric power is generated by first MG 32-1, and hence electric power stored in each power storage device is maintained at a prescribed target.

In addition, converter ECU 22 calculates an electric power allocation ratio indicating a ratio of allocation of charge and discharge electric power between first power storage device 10-1 and the power storage device electrically connected to second converter 12-2 by means of switching device 18. Here, converter ECU 22 separately calculates the electric power allocation ratio to be used during the CD mode and the electric power allocation ratio to be used during the CS mode, and switches between the electric power allocation ratios in accordance with the running mode.

Specifically, with regard to the electric power allocation ratio to be used during the CD mode, converter ECU 22 calculates the electric power allocation ratio between first power storage device 10-1 and the power storage device electrically connected to second converter 12-2 by means of switching device 18, based on a remaining electric power amount of each power storage device. More specifically, when electric power is supplied from power supply system 1 to drive force generation portion 2 (that is, vehicle request power Ps>0), converter ECU 22 calculates the discharge allocation ratio between first power storage device 10-1 and the power storage device electrically connected to second converter 12-2 in accordance with a ratio between an available discharge electric power amount of first power storage device 10-1 connected to first converter 12-1 and the sum of available discharge electric power amounts of second power storage device 10-2 and third power storage device 10-3 that can be connected to second converter 12-2 by means of switching device 18. On the other hand, when electric power is supplied from drive force generation portion 2 to power supply system 1 (that is, vehicle request power Ps<0), converter ECU 22 calculates the charge allocation ratio between first power storage device 10-1 and the power storage device connected to second converter 12-2 in accordance with a ratio between the acceptable charge electric power amount of first power storage device 10-1 and the acceptable charge electric power amount of the power storage device electrically connected to second converter 12-2 by means of switching device 18.

Meanwhile, with regard to the electric power allocation ratio to be used during the CS mode, converter ECU 22 calculates the electric power allocation ratio between first power storage device 10-1 and the power storage device electrically connected to second converter 12-2 such that SOC of first power storage device 10-1 and SOC of the power storage device electrically connected to second converter 12-2 by means of switching device 18 are maintained at a prescribed target. More specifically, converter ECU 22 calculates the electric power allocation ratio between first power storage device 10-1 and the power storage device electrically connected to second converter 12-2 based on a difference (deviation amount) between SOC of each of first power storage device 10-1 and the power storage device electrically connected to second converter 12-2 by means of switching device 18 and a target value thereof. It is noted that the prescribed SOC target above is set, for example, to SOC at the time when CD cancel switch 24 is turned on and transition from the CD mode to the CS mode is made.

Converter ECU 22 controls first converter 12-1 such that voltage Vh is adjusted to a prescribed target voltage and controls second converter 12-2 such that charge and discharge of the power storage device electrically connected to second converter 12-2 by means of switching device 18 is adjusted to a prescribed target amount. It is noted that first converter 12-1 is hereinafter also referred to as a "master converter", and second converter 12-2 is also referred to as a "slave converter".

CD cancel switch 24 is a switch for the driver to switch the running mode from the CD mode, which is the default setting, to the CS mode. CD cancel switch 24 is valid, for example, under the condition as follows. Specifically, when SOC of each power storage device becomes lower, the running mode is set to the CS mode in which engine 36 frequently or continuously operates. Then, if there is subsequently a section where the driver desires to drive in the CD mode (for example, around a driver's house on his/her way home), charged electric power can be maintained by turning on CD cancel switch 24, and when the vehicle reaches the section where the driver desires to drive in the CD mode, the driver can run the desired section in the CD mode by turning off CD cancel switch 24.

Charger 26 is equipment for charging each power storage device from a power supply 28 outside the vehicle (hereinafter also referred to as an "external power supply"). Charger 26 is connected, for example, between second converter 12-2 and switching device 18, and it converts electric power input from vehicle inlet 27 to direct current and outputs it to a power line between second converter 12-2 and switching device 18.

When first power storage device 10-1 is charged by charger 26, first and second converters 12-1 and 12-2 are driven as appropriate, so that charge electric power is supplied successively from charger 26 through second converter 12-2, main positive bus MPL and main negative bus MNL, and first converter 12-1 to first power storage device 10-1. Alternatively, when second power storage device 10-2 is charged by charger 26, relay RY1 is turned on and charge electric power is supplied from charger 26 to second power storage device 10-2. When third power storage device 10-3 is charged by charger 26, relay RY2 is turned on and charge electric power is supplied from charger 26 to third power storage device 10-3.

Figure 2:
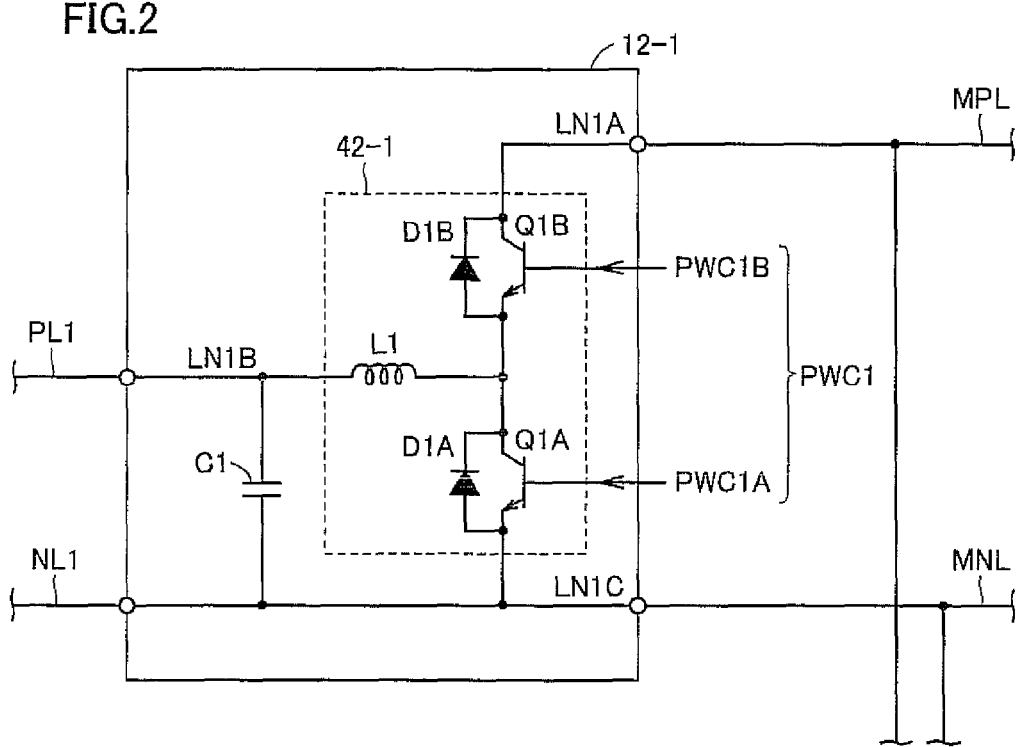
FIG. 2 is a schematic configuration diagram of first and second converters shown in FIG. 1.

FIG. 2 is a schematic configuration diagram of first and second converters 12-1 and 12-2 shown in FIG. 1. As the converters are common in the configuration and the operation, the configuration and the operation of first converter 12-1 will be described hereinafter. Referring to FIG. 2, first converter 12-1 includes a chopper circuit 42-1, a positive bus LN1A, a negative bus LN1C, a line LN1B, and a smoothing capacitor C1. Chopper circuit 42-1 includes switching elements Q1A and Q1B, diodes D1A and D1B, and an inductor L1.

Positive bus LN1A has one end connected to a collector of switching element Q1B and the other end connected to main positive bus MPL. Negative bus LN1C has one end connected to a negative electrode line NL1 and the other end connected to main negative bus MNL.

Switching elements Q1A and Q1B are connected in series between negative bus LN1C and positive bus LN1A. Specifically, an emitter of switching element Q1A is connected to negative bus LN1C, and the collector of switching element Q1B is connected to positive bus LN1A. Diodes D1A and D1B are connected in anti-parallel to switching elements Q1A and Q1B, respectively. Inductor L1 is connected between a connection node of switching elements Q1A and Q1B and line LN1B.

Line LN1B has one end connected to a positive electrode line PL1 and the other end connected to inductor L1. Smoothing capacitor C1 is connected between line LN1B and negative bus LN1C, and reduces an AC component included in a DC voltage across line LN1B and negative bus LN1C.

Chopper circuit 42-1 carries out DC voltage conversion in both directions between first power storage device 10-1 (FIG. 1) and main positive bus MPL, main negative bus MNL, in response to drive signal PWC1 from converter ECU 22 (FIG. 1). Drive signal PWC1 includes a drive signal PWC1A for controlling ON/OFF of switching element Q1A constituting a lower arm element and a drive signal PWC1B for controlling ON/OFF of switching element Q1B constituting an upper arm element. Converter ECU 22 controls a duty ratio (a ratio between an ON period and an OFF period) of switching elements Q1A and Q1B in a certain duty cycle (the sum of the ON period and the OFF period).

When switching elements Q1A and Q1B are controlled to increase on-duty of switching element Q1A (as switching elements Q1A and Q1B are controlled to turn on and off in a complementary manner except for a dead time, on-duty of switching element Q1B decreases), an amount of a pump current that flows from first power storage device 10-1 to inductor L1 increases and electromagnetic energy accumulated in inductor L1 increases. Consequently, at the timing of transition from the ON state to the OFF state of switching element Q1A, an amount of current emitted from inductor L1 through diode D1B to main positive bus MPL increases and the voltage of main positive bus MPL is raised.

On the other hand, when switching elements Q1A and Q1B are controlled to increase on-duty of switching element Q1B (on-duty of switching element Q1A decreases), an amount of a current that flows from main positive bus MPL through switching element Q1B and inductor L1 to power storage device 10-1 increases, and hence the voltage of main positive bus MPL is lowered.

By thus controlling the duty ratio of switching elements Q1A and Q1B, the voltage of main positive bus MPL can be controlled and a direction of a current (electric power) and an amount of the current (the amount of electric power) that flows between first power storage device 10-1 and main positive bus MPL can be controlled.

Figure 3:
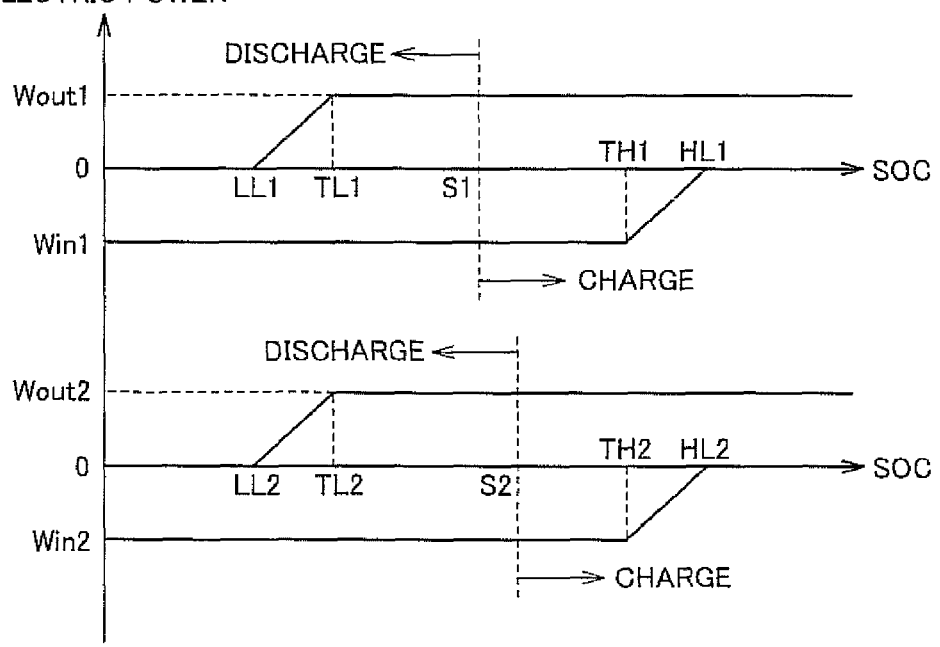
FIG. 3 is a diagram for illustrating allowable discharge electric power and acceptable charge electric power of a power storage device shown in FIG. 1.

FIG. 3 is a diagram for illustrating allowable discharge electric power and acceptable charge electric power of the power storage device shown in FIG. 1. Though first power storage device 10-1 and second power storage device 10-2 are shown in FIG. 3, third power storage device 10-3 should also be understood similarly.

Referring to FIG. 3, allowable discharge electric power Wout1 indicates a maximum value of electric power that can instantaneously be output from first power storage device 10-1. When SOC of first power storage device 10-1 is lower than a lower limit value TL1, allowable discharge electric power Wout1 is restricted. It is noted that a lowermost value LL1 refers to the discharge limit of first power storage device 10-1. Acceptable charge electric power Win1 indicates a maximum value of electric power that can instantaneously be input to first power storage device 10-1. When SOC of first power storage device 10-1 exceeds an upper limit value TH1, acceptable charge electric power Win1 is restricted. It is noted that an uppermost value HL1 indicates the charge limit of first power storage device 10-1. As this is also the case with second power storage device 10-2, description will not be repeated for second power storage device 10-2.

A basic concept of electric power allocation control in the present embodiment will be described with reference to FIG. 3. It is assumed here that power supply system 1 consists of two power storage devices of first power storage device 10-1 and second power storage device 10-2. First power storage device 10-1 and second power storage device 10-2 have SOCs S1 and S2 respectively.

When the running mode is set to the CD mode, the vehicle runs by using electric power stored in each power storage device without maintaining that electric power. Assuming here that first power storage device 10-1 and second power storage device 10-2 equally discharge (here "equal discharge" means that discharged electric power is equal), allowable discharge electric power is restricted in any one of first power storage device 10-1 and second power storage device 10-2 earlier than the other. Then, thereafter, in spite of sufficient discharge capability of the other power storage device, discharge capability of the entire power supply system 1, that is, the total discharge capability of first power storage device 10-1 and second power storage device 10-2, is lowered. Here, electric power is allocated between first power storage device 10-1 and second power storage device 10-2 such that SOCs of first power storage device 10-1 and second power storage device 10-2 simultaneously attain, for example, to lower limit values TL1 and TL2 respectively, so that an occasion (a period) in which discharge capability of the entire power supply system 1 can be exhibited to its maximum can be maximized.

On the other hand, even in the CD mode, during braking of the vehicle or running down a long hill, regenerative power is supplied from drive force generation portion 2 to power supply system 1. Assuming here that first power storage device 10-1 and second power storage device 10-2 are equally charged (here "equal charge" means that charged electric power is equal), acceptable charge electric power is restricted in any one of first power storage device 10-1 and second power storage device 10-2 earlier than the other. Then, thereafter, in spite of sufficient charge capability of the other power storage device, charge capability of the entire power supply system 1, that is, the total charge capability of first power storage device 10-1 and second power storage device 10-2, is lowered. Here, electric power is allocated between first power storage device 10-1 and second power storage device 10-2 such that SOCs of first power storage device 10-1 and second power storage device 10-2 simultaneously attain, for example, to upper limit values TH1 and TH2 respectively, so that an occasion (a period) in which charge capability of the entire power supply system 1 can be exhibited to its maximum can be maximized.

Meanwhile, when the running mode is set to the CS mode, the vehicle runs while maintaining electric power stored in each power storage device. Assuming here that electric power allocation as in the CD mode is made, discharged electric power from the power storage device higher in SOC becomes greater during discharge, and charged electric power to the power storage device lower in SOC becomes greater during charge. Then, while repeating charging and discharging, SOC of first power storage device 10-1 and SOC of second power storage device 10-2 become equal to each other, and electric power stored in each power storage device cannot be maintained.

Accordingly, electric power allocation between first power storage device 10-1 and second power storage device 10-2 is made to maintain electric power stored in each power storage device. Here, for example, it is possible that electric power is allocated in accordance with a ratio between a capacity of first power storage device 10-1 and a capacity of second power storage device 10-2. As shown in FIG. 3, however, actually, the allowable discharge electric power or the acceptable charge electric power is restricted and electric power allocation in accordance with a ratio of capacity between the power storage devices may not be achieved. Accordingly, in the present embodiment, instead of electric power allocation in accordance with the capacity of the power storage device, electric power is allocated to first power storage device 10-1 and second power storage device 10-2 in accordance with a difference (deviation amount) between SOC in each power storage device and a target value to be maintained. Thus, electric power stored in each power storage device can be maintained when the running mode is set to the CS mode.

Figure 4:
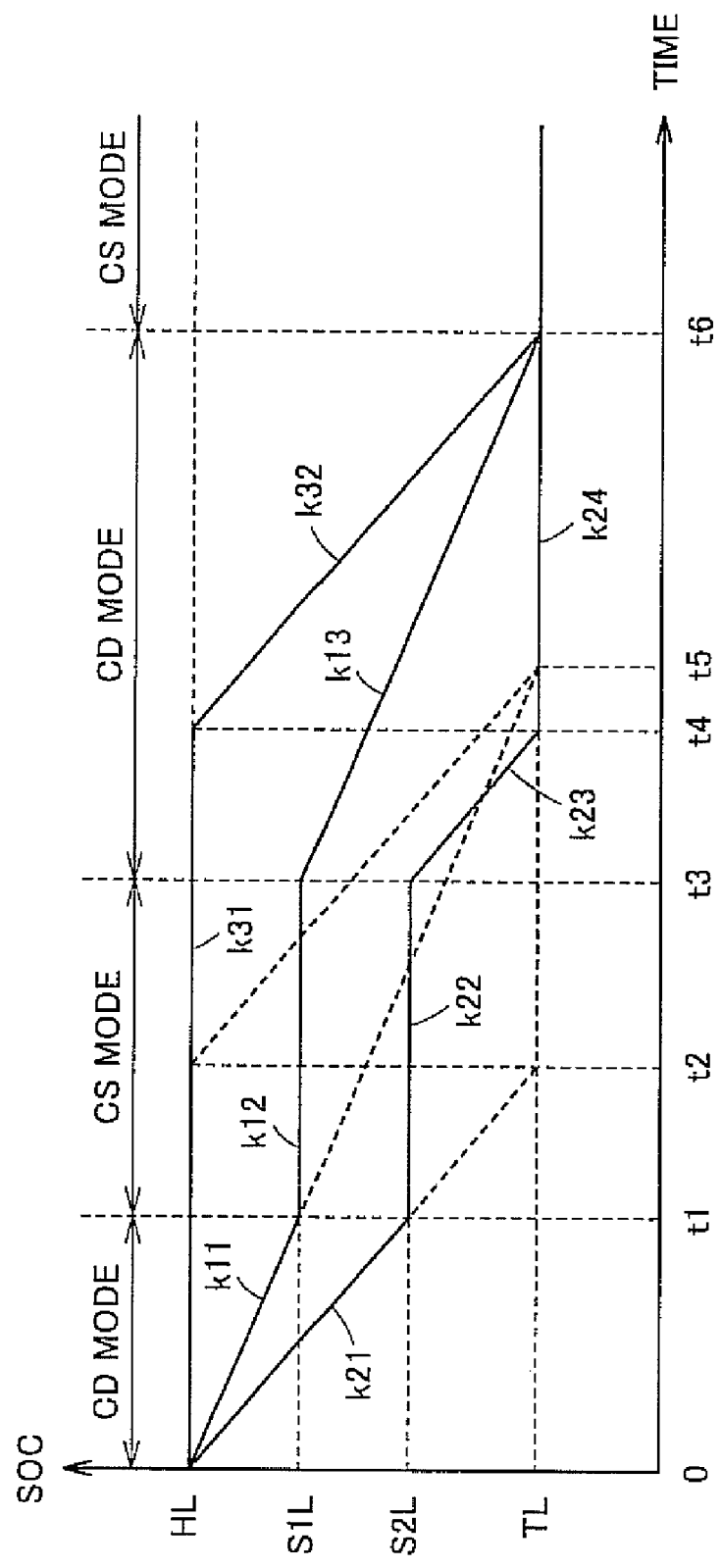
FIG. 4 is a diagram for illustrating a concept of a method of using each power storage device.

FIG. 4 is a diagram for illustrating a concept of a method of using each power storage device. It is noted that upper and lower limit values of SOCs of the power storage devices are equal to one another. In addition, it is assumed in FIG. 4 that running starts from a state where each power storage device is charged by charger 26 to uppermost value HL, which means a full charge state.

Referring to FIG. 4, lines k11, k12 and k13 show variation of SOC of first power storage device 10-1. Lines k21, k22, k23, and k24 show variation of SOC of second power storage device 10-2. Lines k31 and k32 show variation of SOC of third power storage device 10-3.

Out of second power storage device 10-2 and third power storage device 10-3 of which use is switched by switching device 18, second power storage device 10-2 is initially used. From time t0, running in the CD mode is started, and electric power in first power storage device 10-1 and second power storage device 10-2 is consumed and SOCs of first power storage device 10-1 and second power storage device 10-2 decrease. At time t1, when the driver turns on CD cancel switch 24, the mode is switched from the CD mode to the CS mode and SOCs of first power storage device 10-1 and second power storage device 10-2 that is being used are maintained at values (S1L, S2L) at the time when CD cancel switch 24 was turned on.

When CD cancel switch 24 is turned off at time t3, the mode returns from the CS mode to the CD mode and SOCs of first power storage device 10-1 and second power storage device 10-2 start to decrease again. When SOC of second power storage device 10-2 reaches lower limit value TL at time t4, switching device 18 switches the power storage device to be connected to second converter 12-2 from second power storage device 10-2 to third power storage device 10-3. After time t4, electric power from first power storage device 10-1 and third power storage device 10-3 is used for running, and SOCs of first power storage device 10-1 and third power storage device 10-3 together reach lower limit value TL at time t6. After time t6, the running mode is set to the CS mode, and SOCs of first power storage device 10-1 and third power storage device 10-3 are maintained at lower limit value TL.

If the driver did not turn on CD cancel switch 24, when SOC of second power storage device 10-2 reaches lower limit value TL at time t2, the power storage device to be connected to second converter 12-2 is switched from second power storage device 10-2 to third power storage device 10-3. After time t2, electric power from first power storage device 10-1 and third power storage device 10-3 is used for running, and SOCs of first power storage device 10-1 and third power storage device 10-3 together reach lower limit value TL at time t5.

Figure 5:
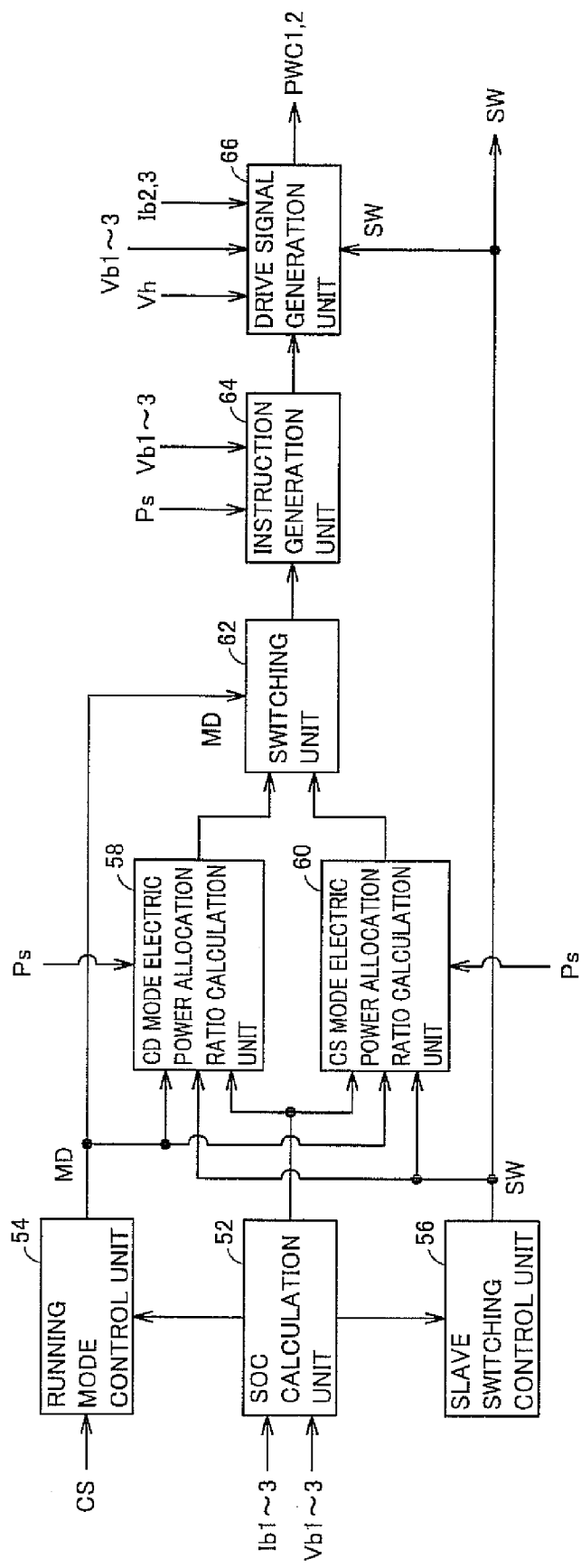
FIG. 5 is a functional block diagram of a converter ECU shown in FIG. 1.

FIG. 5 is a functional block diagram of converter ECU 22 shown in FIG. 1. Referring to FIG. 5, converter ECU 22 includes an SOC calculation unit 52, a running mode control unit 54, a slave switching control unit 56, a CD mode electric power allocation ratio calculation unit 58, a CS mode electric power allocation ratio calculation unit 60, a switching unit 62, an instruction generation unit 64, and a drive signal generation unit 66.

SOC calculation unit 52 calculates a state quantity 51 indicating SOC of first power storage device 10-1 based on each detection value of current Ib1 and voltage Vb1. In addition, SOC calculation unit 52 calculates a state quantity S2 indicating SOC of second power storage device 10-2 based on each detection value of current Ib2 and voltage Vb2. Moreover, SOC calculation unit 52 calculates a state quantity S3 indicating SOC of third power storage device 10-3 based on each detection value of current Ib3 and voltage Vb3. It is noted that various known methods can be used as a method of calculating SOC.

Running mode control unit 54 controls the running mode of the vehicle based on a signal CS from CD cancel switch 24 and SOC of each power storage device calculated by SOC calculation unit 52. Specifically, running mode control unit 54 sets the running mode to the CS mode when it is determined that CD cancel switch 24 has been turned on based on signal CS. In addition, running mode control unit 54 sets the running mode to the CS mode also when SOC of each power storage device reaches lower limit value TL. Otherwise, running mode control unit 54 sets the running mode to the CD mode. Running mode control unit 54 outputs a signal MD indicating the running mode.

Slave switching control unit 56 generates switching signal SW for sequentially switching for use between second power storage device 10-2 and third power storage device 10-3, based on SOCs of second power storage device 10-2 and third power storage device 10-3 calculated by SOC calculation unit 52. For example, when SOC of second power storage device 10-2 is higher than the lower limit value, slave switching control unit 56 inactivates switching signal SW such that second power storage device 10-2 is electrically connected to second converter 12-2, and when SOC of second power storage device 10-2 reaches the lower limit value, slave switching control unit 56 activates switching signal SW such that third power storage device 10-3 is electrically connected to second converter 12-2.

When signal MD from running mode control unit 54 indicates the CD mode, CD mode electric power allocation ratio calculation unit 58 calculates the electric power allocation ratio to be used in the CD mode, based on SOC (S1 to S3) of each power storage device calculated by SOC calculation unit 52, vehicle request power Ps and switching signal SW from slave switching control unit 56.

FIGS. 6 and 7 are diagrams for illustrating a method of calculation of the electric power allocation ratio by CD mode electric power allocation ratio calculation unit 58 shown in FIG. 5. FIG. 6 is a diagram for illustrating a calculation method during discharge in which electric power is supplied from power supply system 1 to drive force generation portion 2, and FIG. 7 is a diagram for illustrating a calculation method during charge in which electric power is supplied from drive force generation portion 2 to power supply system 1.

Referring to FIG. 6, by way of example, FIG. 6 shows an example where second power storage device 10-2 is electrically connected to second converter 12-2 by means of switching device 18. CD mode electric power allocation ratio calculation unit 58 can identify a power storage device electrically connected to second converter 12-2, based on switching signal SW from slave switching control unit 56. For facilitating understanding, it is assumed that lower limit value TL indicating SOC at which restriction of allowable discharge electric power Wout is to be started and lowermost value LL indicating the discharge limit of the power storage device are identical among the power storage devices.

When vehicle request power Ps has a positive value, CD mode electric power allocation ratio calculation unit 58 calculates, with regard to first power storage device 10-1, an available discharge electric power amount R1 of first power storage device 10-1 until SOC reaches lower limit value TL at which allowable discharge electric power Wout1 is to be restricted, as shown in the following equation.

$$R1 = A(S1 - TL) \tag{1}$$

Here, A represents a capacity of first power storage device 10-1 and 51 represents SOC of first power storage device 10-1 when calculation is performed.

Similarly, CD mode electric power allocation ratio calculation unit 58 calculates, with regard to second power storage device 10-2, an available discharge electric power amount R2 of second power storage device 10-2 until SOC reaches lower limit value TL, and calculates, with regard to third power storage device 10-3, an available discharge electric power amount R3 of third power storage device 10-3 until SOC reaches lower limit value TL, as shown in the following equations.

$$R2 = B1(S2-TL) \quad (2)$$

$$R3 = B2(S3-TL) \quad (3)$$

Here, B1 and B2 show capacities of second power storage device 10-2 and third power storage device 10-3 respectively, and S2 and S3 show SOCs of second power storage device 10-2 and third power storage device 10-3 when calculation is performed, respectively.

CD mode electric power allocation ratio calculation unit 58 calculates the electric power allocation ratio between first power storage device 10-1 and second power storage device 10-2 (or third power storage device 10-3) as R1:(R2+R3). Namely, second power storage device 10-2 and third power storage device 10-3 sequentially switched for use are regarded as one power storage portion, and the electric power allocation ratio is calculated such that first power storage device 10-1 and the power storage portion consisting of second power storage device 10-2 and third power storage device 10-3 simultaneously attain to the lower limit value.

Referring to FIG. 7, by way of example, FIG. 7 shows an example where third power storage device 10-3 is electrically connected to second converter 12-2 by means of switching device 18. Here again, for facilitating understanding, it is assumed that upper limit value TH indicating SOC at which restriction of acceptable charge electric power Win is to be started and uppermost value HL indicating the charge limit of the power storage device are identical among the power storage devices.

When vehicle request power Ps has a negative value, CD mode electric power allocation ratio calculation unit 58 calculates, with regard to first power storage device 10-1, an acceptable charge electric power amount C1 of first power storage device 10-1 until SOC reaches upper limit value TH at which acceptable charge electric power Win1 is to be restricted, as shown in the following equation.

$$C1 = A(TH-S1) \quad (4)$$

Similarly, CD mode electric power allocation ratio calculation unit 58 calculates, with regard to third power storage device 10-3 that is being used, an acceptable charge electric power amount C3 of third power storage device 10-3 until SOC reaches upper limit value TH, as shown in the following equation.

$$C3 = B2(TH-S3) \quad (5)$$

Then, CD mode electric power allocation ratio calculation unit 58 calculates the electric power allocation ratio between first power storage device 10-1 and third power storage device 10-3 as C1:C3. Namely, the electric power allocation ratio is calculated such that first power storage device 10-1 and third power storage device 10-3 that is being used simultaneously attain to the upper limit value during charge.

It is noted that the electric power allocation ratio in an example where second power storage device 10-2 is electrically connected to second converter 12-2 by means of switching device 18 can also similarly be calculated.

Referring again to FIG. 5, when signal MD from running mode control unit 54 indicates the CS mode, CS mode electric power allocation ratio calculation unit 60 calculates the electric power allocation ratio to be used in the CS mode, based on SOC (S1 to S3) of each power storage device calculated by SOC calculation unit 52, vehicle request power Ps, and switching signal SW from slave switching control unit 56.

FIGS. 8 to 12 are diagrams for illustrating a method of calculation of the electric power allocation ratio by CS mode electric power allocation ratio calculation unit 60 shown in FIG. 5. By way of example, FIGS. 8 to 12 show examples where second power storage device 10-2 is electrically connected to second converter 12-2 by means of switching device 18. It is noted that CS mode electric power allocation ratio calculation unit 60 can identify a power storage device electrically connected to second converter 12-2 based on switching signal SW from slave switching control unit 56.

Referring to FIG. 8, when the running mode is switched from the CD mode to the CS mode, CS mode electric power allocation ratio calculation unit 60 latches SOCs (S1L, S2L) of first power storage device 10-1 and second power storage device 10-2 electrically connected to second converter 12-2 at that time. Then, CS mode electric power allocation ratio calculation unit 60 calculates a deviation amount $\Delta S1$ from S1L, of SOC of first power storage device 10-1 and a deviation amount $\Delta S2$ from S2L, of SOC of second power storage device 10-2.

$$\Delta S1 = S1 - S1L \quad (6)$$

$$\Delta S2 = S2 - S2L \quad (7)$$

Here, S1 and S2 represent SOCs of first power storage device 10-1 and second power storage device 10-2, respectively, when calculation is performed.

FIG. 8 shows an example where relation of $\Delta S1 \geq 0$ and $\Delta S2 \geq 0$ is satisfied. When relation of $\Delta S1 \geq 0$ and $\Delta S2 \geq 0$ is satisfied, CS mode electric power allocation ratio calculation unit 60 sets an electric power allocation ratio D1:D2 between first power storage device 10-1 and second power storage device 10-2 as follows, distinguishing between during discharge in which electric power is supplied from power supply system 1 to drive force generation portion 2 and during charge in which electric power is supplied from drive force generation portion 2 to power supply system 1.

$$\text{(during discharge)} \ D1:D2 = \Delta S1:\Delta S2 \quad (8)$$

$$\text{(during charge)} \ D1:D2 = \Delta S2:\Delta S1 \quad (9)$$

Namely, when electric power is supplied from power supply system 1 to drive force generation portion 2 (vehicle request power Ps>0), the electric power allocation ratio between first power storage device 10-1 and second power storage device 10-2 is set in accordance with the ratio between deviation amount $\Delta S1$ of first power storage device 10-1 and deviation amount $\Delta S2$ of second power storage device 10-2. When electric power is supplied from drive force generation portion 2 to power supply system 1 (vehicle request power Ps<0), the electric power allocation ratio between first power storage device 10-1 and second power storage device 10-2 is set in accordance with an inverse ratio between deviation amounts $\Delta S1$ and $\Delta S2$. When electric power is supplied from drive force generation portion 2 to power supply system 1 while relation of $\Delta S1 \geq 0$ and $\Delta S2 \geq 0$ is satisfied, by allocating electric power to first power storage device 10-1 and second power storage device 10-2 in accordance with the inverse ratio between deviation amounts $\Delta S1$ and $\Delta S2$, deviation amount $\Delta S1$ in first power storage device 10-1 and deviation amount $\Delta S2$ in second power storage device 10-2 are equalized with each other.

Referring next to FIG. 9, FIG. 9 shows an example where relation of $\Delta S1 \geq 0$ and $\Delta S2 < 0$ is satisfied. When relation of $\Delta S1 \geq 0$ and $\Delta S2 < 0$ is satisfied, CS mode electric power allocation ratio calculation unit 60 sets electric power allocation ratio D1:D2 between first power storage device 10-1 and second power storage device 10-2, as shown in the following.

$$\text{(during discharge)} \ D1:D2 = 100:0 \quad (10)$$

$$\text{(during charge)} \ D1:D2 = 0:100 \quad (11)$$

Namely, when electric power is supplied from power supply system 1 to drive force generation portion 2 (vehicle request power Ps>0), the electric power allocation ratio is set such that first power storage device 10-1 alone, of which deviation amount has a positive value, discharges. When electric power is supplied from drive force generation portion 2 to power supply system 1 (vehicle request power Ps<0), the electric power allocation ratio is set such that second power storage device 10-2 alone, of which deviation amount has a negative value, is charged.

Referring to FIG. 10, FIG. 10 shows an example where relation of $\Delta S1<0$ and $\Delta S2\geqq 0$ is satisfied. When relation of $\Delta S1<0$ and $\Delta S2\geqq 0$ is satisfied, CS mode electric power allocation ratio calculation unit 60 sets electric power allocation ratio D1:D2 between first power storage device 10-1 and second power storage device 10-2, as shown in the following.

$$\text{(during discharge) } D1:D2=0:100 \quad (12)$$

$$\text{(during charge) } D1:D2=100:0 \quad (13)$$

Namely, when electric power is supplied from power supply system 1 to drive force generation portion 2 (vehicle request power Ps>0), the electric power allocation ratio between first power storage device 10-1 and second power storage device 10-2 is set such that second power storage device 10-2 alone, of which deviation amount has a positive value, discharges. When electric power is supplied from drive force generation portion 2 to power supply system 1 (vehicle request power Ps<0), the electric power allocation ratio is set such that first power storage device 10-1 alone, of which deviation amount has a negative value, is charged.

Figure 11:
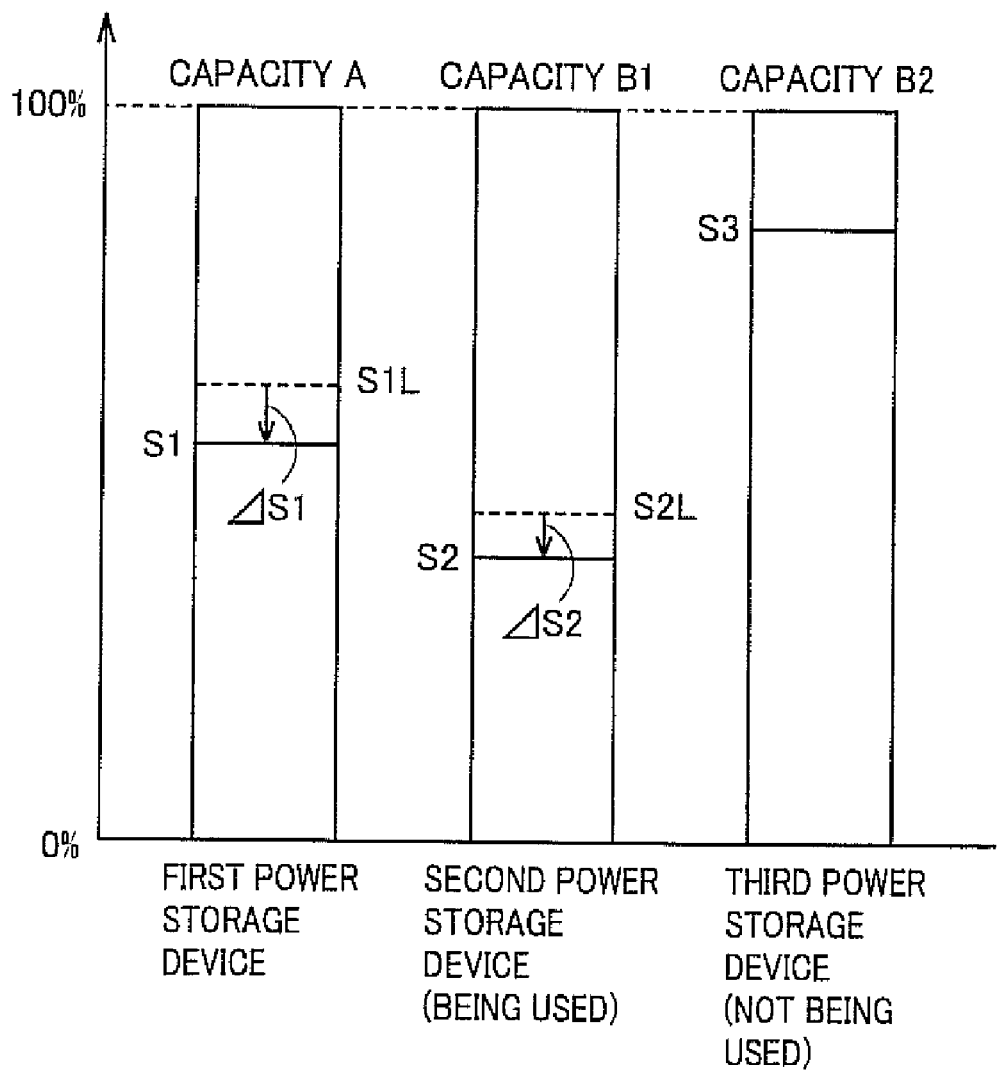
FIG. 11 is a fourth diagram for illustrating a method of calculation of an electric power allocation ratio by the CS mode electric power allocation ratio calculation unit shown in FIG. 5.

Referring to FIG. 11, FIG. 11 shows an example where relation of $\Delta S1<0$ and $\Delta S2\geqq 0$ is satisfied. When relation of $\Delta S1<0$ and $\Delta S2\geqq 0$ is satisfied, CS mode electric power allocation ratio calculation unit 60 sets electric power allocation ratio D1:D2 between first power storage device 10-1 and second power storage device 10-2, as shown in the following.

$$\text{(during discharge) } D1:D2=\Delta S2:\Delta S1 \quad (14)$$

$$\text{(during charge) } D1:D2=\Delta S1:\Delta S2 \quad (15)$$

Namely, when electric power is supplied from drive force generation portion 2 to power supply system 1 (vehicle request power Ps<0), the electric power allocation ratio is set in accordance with the ratio between deviation amount $\Delta S1$ of first power storage device 10-1 and deviation amount $\Delta S2$ of second power storage device 10-2. When electric power is supplied from power supply system 1 to drive force generation portion 2 (vehicle request power Ps>0), the electric power allocation ratio between first power storage device 10-1 and second power storage device 10-2 is set in accordance with an inverse ratio between deviation amounts $\Delta S1$ and $\Delta S2$. When electric power is supplied from power supply system 1 to drive force generation portion 2 while relation of $\Delta S1<0$ and $\Delta S2<0$ is satisfied, by allocating electric power to first power storage device 10-1 and second power storage device 10-2 in accordance with the inverse ratio between deviation amounts $\Delta S1$ and $\Delta S2$, deviation amount $\Delta S1$ in first power storage device 10-1 and deviation amount $\Delta S2$ in second power storage device 10-2 are equalized with each other.

Figure 12:
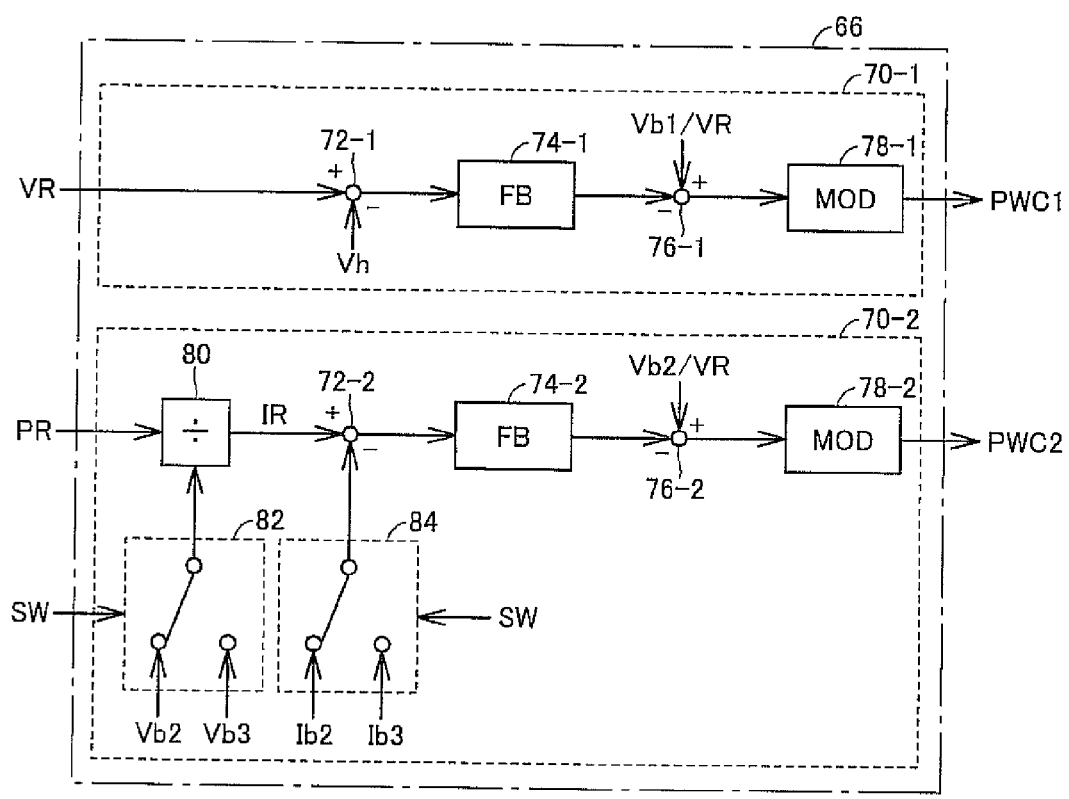
FIG. 12 is a detailed functional block diagram of a drive signal generation unit shown in FIG. 5.

FIG. 12 is a detailed functional block diagram of drive signal generation unit 66 shown in FIG. 5. Referring to FIG. 12, drive signal generation unit 66 includes a first control unit 70-1 and a second control unit 70-2. First control unit 70-1 includes subtraction units 72-1 and 76-1, a feedback (FB) control unit 74-1, and a modulation unit 78-1.

Subtraction unit 72-1 subtracts a detection value of voltage Vh from target voltage VR and outputs the result of calculation to FB control unit 74-1. FB control unit 74-1 calculates an FB compensation amount based on the output from subtraction unit 72-1 and outputs the result of calculation to subtraction unit 76-1. For example, FB control unit 74-1 performs proportional integral operation based on the output from subtraction unit 72-1 and outputs the result of operation to subtraction unit 76-1.

Subtraction unit 76-1 subtracts the output from FB control unit 74-1 from a reciprocal of a theoretical boost ratio of first converter 12-1 expressed as (voltage Vb1)/(target voltage VR) and outputs the result of calculation as a duty instruction to modulation unit 78-1. It is noted that an input term in subtraction unit 76-1 (Vb1/VR) is a feedforward (FF) compensation term based on the theoretical boost ratio of first converter 12-1.

Modulation unit 78-1 generates drive signal PWC1 based on the duty instruction output from subtraction unit 76-1 and carrier waves generated by a not-shown oscillation unit and outputs generated drive signal PWC1 to first converter 12-1.

Second control unit 70-2 includes subtraction units 72-2 and 76-2, a FB control unit 74-2, a modulation unit 78-2, a division unit 80, and switches 82 and 84.

Switch 82 outputs a detection value of voltage Vb2 to division unit 80 while switching signal SW from slave switching control unit 56 (FIG. 5) is inactivated (second power storage device 10-2 is being used). On the other hand, switch 82 outputs a detection value of voltage Vb3 to division unit 80 while switching signal SW is activated (third power storage device 10-3 is being used). Division unit 80 divides target electric power PR by the output from switch 82 and outputs the result of calculation to subtraction unit 72-2 as a target current IR.

Switch 84 outputs a detection value of current Ib2 to subtraction unit 72-2 while switching signal SW is inactivated. On the other hand, switch 84 outputs a detection value of current Ib3 to subtraction unit 72-2 while switching signal SW is activated. Subtraction unit 72-2 subtracts the output from switch 84 from target current IR and outputs the result of calculation to FB control unit 74-2. FB control unit 74-2 calculates an FB compensation amount based on the output from subtraction unit 72-2 and outputs the result of calculation to subtraction unit 76-2. For example, FB control unit 74-2 performs proportional integral operation based on the output from subtraction unit 72-2 and outputs the result of operation to subtraction unit 76-2.

Subtraction unit 76-2 subtracts the output from FB control unit 74-2 from a reciprocal of a theoretical boost ratio of converter 12-2 expressed as (voltage Vb2)/(target voltage VR) and outputs the result of calculation as a duty instruction to modulation unit 78-2. It is noted that an input term in subtraction unit 76-2 (Vb2/VR) is a feedforward compensation term based on the theoretical boost ratio of converter 12-2.

Modulation unit 78-2 generates drive signal PWC2 based on the duty instruction output from subtraction unit 76-2 and carrier waves generated by a not-shown oscillation unit and outputs generated drive signal PWC2 to converter 12-2.

Figure 13:
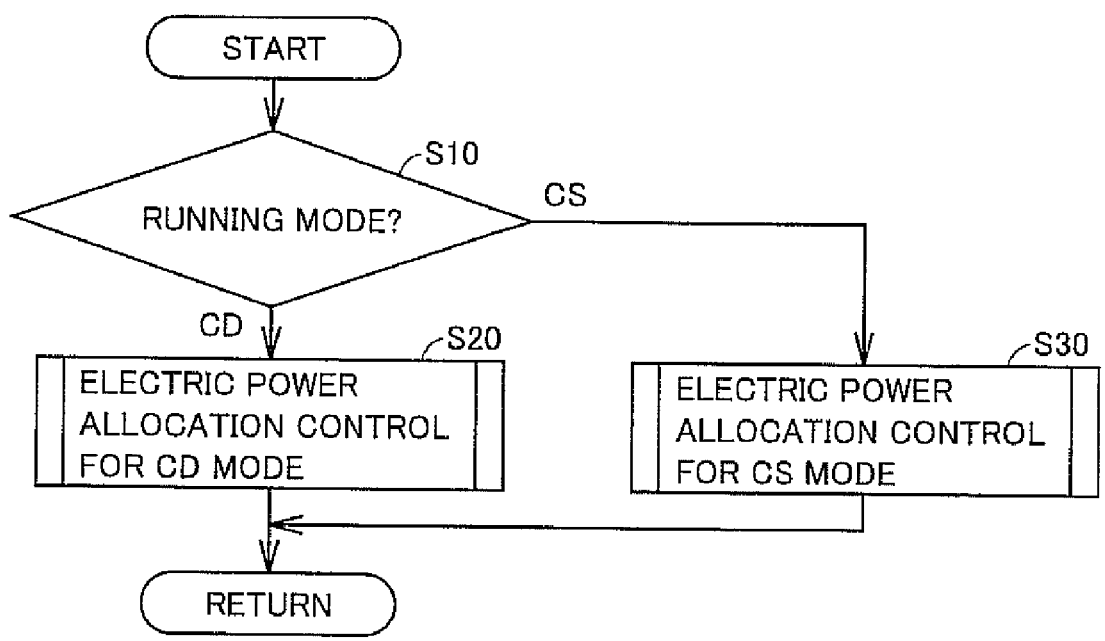
FIG. 13 is a flowchart for illustrating a control structure of the converter ECU shown in FIG. 1.

FIG. 13 is a flowchart for illustrating a control structure of converter ECU 22 shown in FIG. 1. Processing in the flowchart is invoked from a main routine and performed every prescribed time or each time a prescribed condition is satisfied.

Referring to FIG. 13, converter ECU 22 determines whether the running mode is set to the CD mode or the CS mode (step S10). As described above, when the driver turns on CD cancel switch 24, the running mode is set to the CS mode, and when SOC of each power storage device attains to the lower limit value as well, the running mode is set to the CS mode. Otherwise, the running mode is set to the CD mode.

When it is determined in step S10 that the running mode is set to the CD mode ("CD" in step S10), converter ECU 22 executes a sub routine in which electric power allocation control for the CD mode is carried out (step S20). On the other hand, when it is determined in step S10 that the running mode is set to the CS mode ("CS" in step S10), converter ECU 22 executes a sub routine in which electric power allocation control for the CS mode is carried out (step S30).

Figure 14:
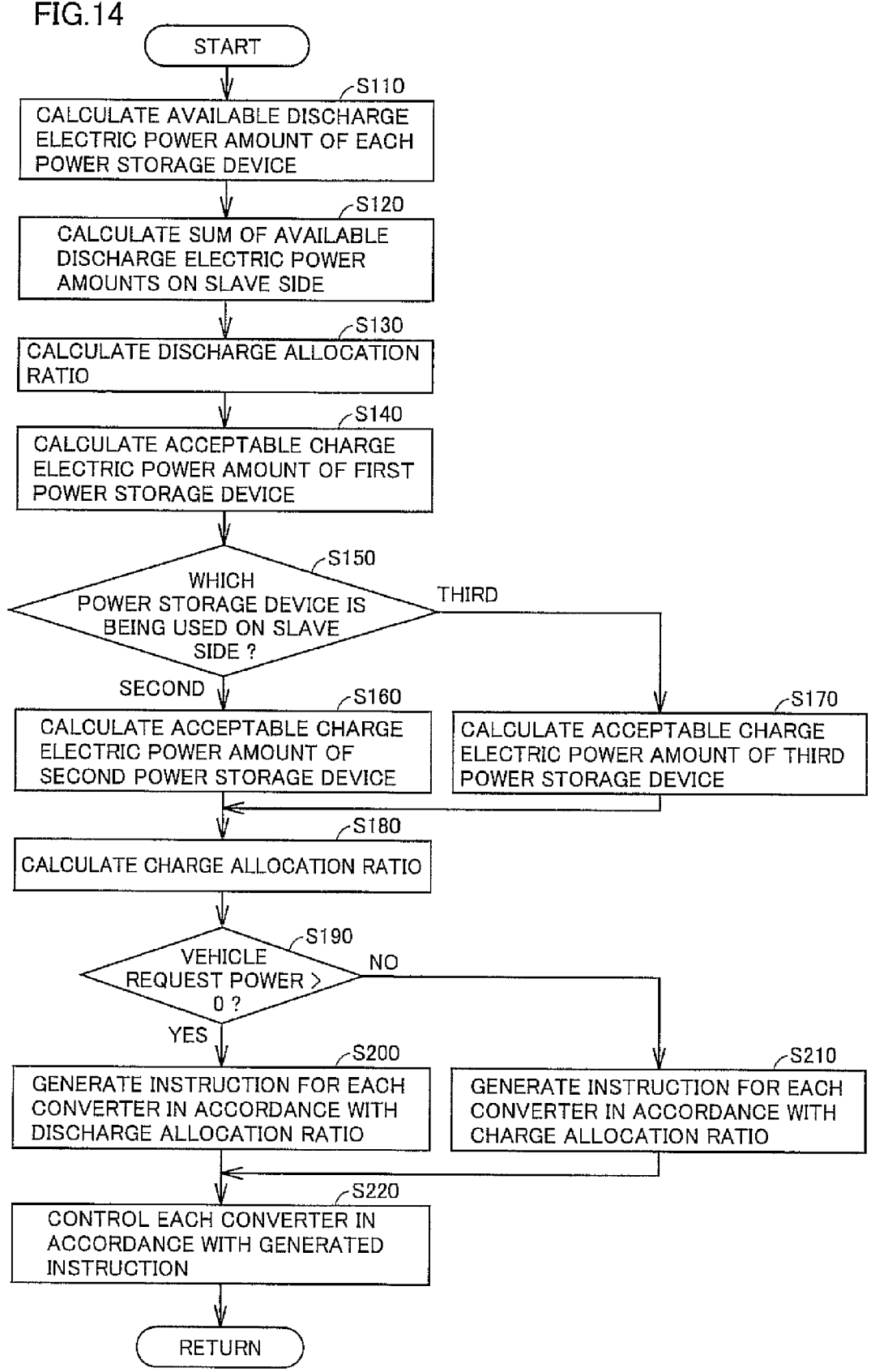
FIG. 14 is a flowchart for illustrating a structure of a sub routine for controlling CD mode electric power allocation shown in FIG. 13.

FIG. 14 is a flowchart for illustrating a structure of the sub routine for controlling CD mode electric power allocation shown in FIG. 13. Referring to FIG. 14, converter ECU 22 calculates available discharge electric power amount R1 of first power storage device 10-1, available discharge electric power amount R2 of second power storage device 10-2 and available discharge electric power amount R3 of third power storage device 10-3, by using the equations (1) to (3) above (step S110). Thereafter, converter ECU 22 calculates the sum of available discharge electric power amounts R2 and R3 on the slave side (step S120). Then, converter ECU 22 calculates electric power allocation ratio (discharge allocation ratio) R1:(R2+R3) based on the result of calculation in steps S110 and 5120 (step S130).

In succession, converter ECU 22 calculates acceptable charge electric power amount C1 of first power storage device 10-1 by using the equation (4) above (step S140). Thereafter, converter ECU 22 determines whether the power storage device currently electrically connected to second converter 12-2 by means of switching device 18 on the slave side is second power storage device 10-2 or third power storage device 10-3, based on switching signal SW (step S150).

When it is determined that second power storage device 10-2 is electrically connected to second converter 12-2 ("second" in step S150), converter ECU 22 calculates acceptable charge electric power amount C2 of second power storage device 10-2 (step S160). On the other hand, when it is determined in step S150 that third power storage device 10-3 is electrically connected to second converter 12-2 ("third" in step S150), converter ECU 22 calculates acceptable charge electric power amount C3 of third power storage device 10-3 by using the equation (5) above (step S170).

When second power storage device 10-2 is electrically connected to second converter 12-2, converter ECU 22 calculates electric power allocation ratio (charge allocation ratio) C1:C2 based on calculated acceptable charge electric power amounts C1 and C2. On the other hand, when third power storage device 10-3 is electrically connected to second converter 12-2, converter ECU 22 calculates electric power allocation ratio (charge allocation ratio) C1:C3 based on acceptable charge electric power amounts C1 and C3 (step S180).

Thereafter, converter ECU 22 determines whether vehicle request power Ps received from MG-ECU 40 of drive force generation portion 2 has a positive value or not (step S190). When it is determined that vehicle request power Ps has a positive value (YES in step S190), converter ECU 22 generates drive signals PWC1 and PWC2 for driving first converter 12-1 and second converter 12-2 respectively in accordance with the electric power allocation ratio (discharge allocation ratio) calculated in step S130, with the method described above (step S200).

On the other hand, when it is determined in step S190 that vehicle request power Ps does not have a positive value (NO in step S190), converter ECU 22 generates drive signals PWC1 and PWC2 in accordance with the electric power allocation ratio (charge allocation ratio) calculated in step S180, with the method described above (step S210).

Then, converter ECU 22 outputs drive signals PWC1 and PWC2 generated in step S200 or step S210 to first converter 12-1 and second converter 12-2 respectively, and controls first converter 12-1 and second converter 12-2 (step S220).

FIG. 15 is a flowchart for illustrating a structure of the sub routine for controlling CS mode electric power allocation shown in FIG. 13. Referring to FIG. 15, converter ECU 22 latches SOC of each power storage device at the time when transition from the CD mode to the CS mode is made (step S310). It is noted that the SOC latched at this time is set as the target SOC in the CS mode.

Thereafter, converter ECU 22 determines whether the power storage device currently electrically connected to second converter 12-2 by means of switching device 18 on the slave side is second power storage device 10-2 or third power storage device 10-3, based on switching signal SW (step S320).

When it is determined that second power storage device 10-2 is electrically connected to second converter 12-2 ("second" in step S320), converter ECU 22 calculates the deviation amount from the target SOC, of the SOC of each of first power storage device 10-1 and second power storage device 10-2 by using the equations (6) and (7) above (step S330). Then, converter ECU 22 calculates the electric power allocation ratio (discharge allocation ratio and charge allocation ratio) between first power storage device 10-1 and second power storage device 10-2 based on the calculated deviation amount, by using the equations (8) to (15) above (step S340).

More specifically, with regard to deviation amounts ΔS1 and ΔS2 calculated in step S330, when relation of ΔS1≧0 and ΔS2≧0 is satisfied and when vehicle request power Ps>0 (that is, electric power is supplied from power supply system 1 to drive force generation portion 2), converter ECU 22 calculates the discharge allocation ratio based on the equation (8) above. When vehicle request power Ps<0 (that is, electric power is supplied from drive force generation portion 2 to power supply system 1), converter ECU 22 calculates the charge allocation ratio based on the equation (9) above. In addition, when relation of ΔS1≧0 and ΔS2<0 is satisfied and when vehicle request power Ps>0, converter ECU 22 calculates the discharge allocation ratio based on the equation (10) above. When vehicle request power Ps<0, converter ECU 22 calculates the charge allocation ratio based on the equation (11) above. Moreover, when relation of ΔS1<0 and ΔS2≧0 is satisfied and when vehicle request power Ps>0, converter ECU 22 calculates the discharge allocation ratio based on the equation (12) above. When vehicle request power Ps<0, converter ECU 22 calculates the charge allocation ratio based on the equation (13) above. Further, when relation of ΔS1<0 and ΔS2<0 is satisfied and when vehicle request power Ps>0, converter ECU 22 calculates the discharge allocation ratio based on the equation (14) above. When vehicle request power Ps<0, converter ECU 22 calculates the charge allocation ratio based on the equation (15) above.

On the other hand, when it is determined in step S320 that third power storage device 10-3 is electrically connected to second converter 12-2 ("third" in step S320), converter ECU 22 calculates the deviation amount from the target SOC, of the SOC of each of first power storage device 10-1 and third power storage device 10-3 (step S350). It is noted that a deviation amount ΔS3 of third power storage device 10-3 is also calculated as in the case of first and second power storage devices 10-1 and 10-2, in accordance with the equations (6) and (7) above.

Then, converter ECU 22 calculates the electric power allocation ratio (discharge allocation ratio and charge allocation ratio) between first power storage device 10-1 and third power storage device 10-3 based on the calculated deviation amount (step S360). It is noted that the electric power allocation ratio between first power storage device 10-1 and third power storage device 10-3 is also calculated as in calculating the electric power allocation ratio between first power storage device 10-1 and second power storage device 10-2, in accordance with the equations (8) to (15) above.

Thereafter, converter ECU 22 determines whether vehicle request power Ps received from MG-ECU 40 of drive force generation portion 2 has a positive value or not (step S370). When it is determined that vehicle request power Ps has a positive value (YES in step S370), converter ECU 22 generates drive signals PWC1 and PWC2 in accordance with the electric power allocation ratio (discharge allocation ratio) calculated in step S340 or S360, with the method described above (step S380).

On the other hand, when it is determined in step S370 that vehicle request power Ps does not have a positive value (NO in step S370), converter ECU 22 generates drive signals PWC1 and PWC2 in accordance with the electric power allocation ratio (charge allocation ratio) calculated in step S340 or S360, with the method described above (step S390).

Then, converter ECU 22 outputs drive signals PWC1 and PWC2 generated in step S380 or step S390 to first converter 12-1 and second converter 12-2 respectively, and controls first converter 12-1 and second converter 12-2 (step S400).

As described above, according to the present embodiment, as SOC of second power storage device 10-2 attains to the lower limit value, third power storage device 10-3 is connected to second converter 12-2 by means of switching device 18, so that second power storage device 10-2 and third power storage device 10-3 are sequentially switched for use. During the CD mode, the electric power allocation ratio between first power storage device 10-1 and the power storage device connected to second converter 12-2 by means of switching device 18 is calculated based on the remaining electric power amount of each of first to third power storage devices 10-1 to 10-3, and first and second converters 12-1 and 12-2 are controlled in accordance with the calculated electric power allocation ratio. Thus, such a case that any of first power storage device 10-1 and second and third power storage devices 10-2 and 10-3 sequentially switched for use reaches the discharge limit earlier than the other is suppressed. Here, during the CS mode, the electric power allocation ratio between first power storage device 10-1 and the power storage device connected to second converter 12-2 is calculated based on the deviation amount between SOC in each of first power storage device 10-1 and the power storage device connected to second converter 12-2 by means of switching device 18 and the target value thereof, and first and second converters 12-1 and 12-2 are controlled in accordance with the calculated electric power allocation ratio. Thus, SOC during the CS mode is maintained, and such a case that any of first power storage device 10-1 and second and third power storage devices 10-2 and 10-3 sequentially switched for use reaches the discharge limit earlier than the other is suppressed also after returning from the CS mode to the CD mode. Therefore, according to the present embodiment, electric power is appropriately allocated in accordance with the running mode (CD mode/CS mode), and consequently, capability of power supply system 1 having a plurality of power storage devices can be exhibited to its maximum.

In the embodiment above, regarding the power storage device on the slave side, it is assumed that second power storage device 10-2 is used prior to third storage device 10-3, however, third power storage device 10-3 may be used first. Alternatively, each time a vehicle system is started up, a power storage device to be used first may be switched.

In addition, in the description above, with regard to second converter 12-2, target current IR is calculated based on target electric power PR, and current FB control based on a difference between calculated target current IR and the detection value of the current sensor is carried out. Alternatively, actual electric power input and output to/from a power storage device being used on the slave side may be calculated and electric power FB control based on a difference between target electric power PR and the calculated actual electric power may be carried out.

Moreover, in the description above, first converter 12-1 is subjected to voltage FB control and second converter 12-2 is subjected to current FB control (electric power FB control is also applicable). Alternatively, first converter 12-1 may be subjected to current FB control (or electric power FB control) and second converter 12-2 may be subjected to voltage FB control.

Further, an example where two power storage devices on the slave side are provided is illustrated above, however, three or more power storage devices on the slave side may be provided.

In addition, in the description above, drive force generation portion 2 includes first MG 32-1 and second MG 32-2, however, the number of MGs included in drive force generation portion 2 is not limited to two.

Moreover, in the description above, a series/parallel type hybrid vehicle in which motive power of engine 36 is split by power split device 34 and the split power can be transmitted to driving wheel 38 and first MG 32-1 is illustrated, however, the present invention is also applicable to hybrid vehicles of other types. Specifically, for example, the present invention is also applicable to what is called a series type hybrid vehicle in which engine 36 is used only for driving first MG 32-1 and second MG 32-2 alone generates drive force of the vehicle, a hybrid vehicle in which only regenerative energy out of kinetic energy generated by engine 36 is recovered as electric energy, a motor-assisted type hybrid vehicle in which an engine serves as a main motive power source and a motor assists the engine as necessary, and the like.

Further, the present invention is also applicable to an electric car that runs only with electric power without including engine 36 and a fuel cell car including a fuel cell in addition to a power storage device as a power supply.

In the description above, main positive bus MPL and main negative bus MNL correspond to embodiments of the "power line" in the present invention, and first converter 12-1 and second converter 12-2 correspond to embodiments of the "first converter" and the "second converter" in the present invention, respectively. In addition, first power storage device 10-1 corresponds to one embodiment of the "first power storage device" in the present invention, and second power storage device 10-2 and third power storage device 10-3 correspond to one embodiment of a "plurality of second power storage devices" in the present invention.

Moreover, converter ECU 22 corresponds to one embodiment of the "control device" in the present invention, and slave switching control unit 56 corresponds to one embodiment of the "switching control unit" in the present invention. Further, CD mode electric power allocation ratio calculation unit 58 corresponds to one embodiment of the "first electric power allocation ratio calculation unit" in the present invention, and CS mode electric power allocation ratio calculation unit 60 corresponds to one embodiment of the "second electric power allocation ratio calculation unit" in the present invention. Furthermore, switching unit 62, instruction generation unit 64 and drive signal generation unit 66 correspond to one embodiment of the "converter control unit" in the present invention, and system relays RY1 and RY2 correspond to one embodiment of a "plurality of relays" in the present invention.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A power supply system mounted on a vehicle capable of running while switching between a first running mode of running using electric power stored for running without maintaining said electric power and a second running mode of running while maintaining said electric power at a prescribed target, comprising:
    a power line for supplying and receiving electric power between a drive force generation portion for generating drive force for running upon receiving electric power from the power supply system and the power supply system;
    first and second converters connected in parallel to said power line;
    a first rechargeable power storage device connected to said first converter;
    a plurality of second rechargeable power storage devices;
    a switching device provided between said plurality of second power storage devices and said second converter, configured to connect any one of said plurality of second power storage devices to said second converter in accordance with a provided instruction; and
    a control device for controlling said first and second converters and said switching device, and
    said control device including
        a switching control unit for generating said instruction for sequentially switching for use said plurality of second power storage devices such that, when a state quantity indicating a charged state of the second power storage device connected to said second converter is lower than a predetermined value, a remaining second power storage device of which state quantity is not lower than said predetermined value is connected to said second converter, and outputting said instruction to said switching device,
        a first electric power allocation ratio calculation unit for calculating, based on a remaining electric power amount of each of said first power storage device and said plurality of second power storage devices, a first electric power allocation ratio indicating a ratio of allocation of charge and discharge electric power between said first power storage device and the second power storage device connected to said second converter by means of said switching device, to be used during said first running mode,
        a second electric power allocation ratio calculation unit for calculating, based on a difference between said state quantity in each of said first power storage device and the second power storage device connected to said second converter by means of said switching device and a target value thereof, a second electric power allocation ratio indicating a ratio of allocation of charge and discharge electric power between said first power storage device and the second power storage device connected to said second converter, to be used during said second running mode, and
        a converter control unit for controlling said first and second converters in accordance with said first electric power allocation ratio during said first running mode and controlling said first and second converters in accordance with said second electric power allocation ratio during said second running mode.

2. The power supply system according to claim 1, wherein
said target value of said first power storage device is set to said state quantity of said first power storage device attained when transition from said first running mode to said second running mode is made, and
said target value of the second power storage device connected to said second converter by means of said switching device is set to said state quantity of said second power storage device attained when transition from said first running mode to said second running mode is made.

3. The power supply system according to claim 1, wherein
said second electric power allocation ratio calculation unit calculates, when a first value obtained by subtracting the target value of said state quantity of said first power storage device from said state quantity of said first power storage device has a positive value and a second value obtained by subtracting the target value of said state quantity of the second power storage device connected to said second converter by means of said switching device from said state quantity of the second power storage device has a positive value,
said second electric power allocation ratio such that said first power storage device and the second power storage device connected to said second converter discharge in accordance with a ratio between said first value and said second value when electric power is supplied from the power supply system to said drive force generation portion, and
said second electric power allocation ratio such that said first power storage device and the second power storage device connected to said second converter are charged in accordance with an inverse ratio between said first value and said second value when electric power is supplied from said drive force generation portion to the power supply system.

4. The power supply system according to claim 1, wherein
said second electric power allocation ratio calculation unit calculates, when a first value obtained by subtracting the target value of said state quantity of said first power storage device from said state quantity of said first power storage device has a negative value and a second value obtained by subtracting the target value of said state quantity of the second power storage device connected to said second converter by means of said switching device from said state quantity of the second power storage device has a negative value,
said second electric power allocation ratio such that said first power storage device and the second power storage device connected to said second converter are charged in accordance with a ratio between said first value and said second value when electric power is supplied from said drive force generation portion to the power supply system, and
said second electric power allocation ratio such that said first power storage device and the second power storage device connected to said second converter discharge in accordance with an inverse ratio between said first value and said second value when electric power is supplied from the power supply system to said drive force generation portion.

5. The power supply system according to claim 1, wherein said second electric power allocation ratio calculation unit calculates, when a value obtained by subtracting the target value of said state quantity of said first power storage device from said state quantity of said first power storage device has a positive value and a value obtained by subtracting the target value of said state quantity of the second power storage device connected to said second converter by means of said switching device from said state quantity of the second power storage device has a negative value, said second electric power allocation ratio such that said first power storage device alone discharges when electric power is supplied from the power supply system to said drive force generation portion, and said second electric power allocation ratio such that the second power storage device alone connected to said second converter is charged when electric power is supplied from said drive force generation portion to the power supply system.

6. The power supply system according to claim 1, wherein said second electric power allocation ratio calculation unit calculates, when a value obtained by subtracting the target value of said state quantity of said first power storage device from said state quantity of said first power storage device has a negative value and a value obtained by subtracting the target value of said state quantity of the second power storage device connected to said second converter by means of said switching device from said state quantity of the second power storage device has a positive value, said second electric power allocation ratio such that said second power storage device alone connected to said second converter discharges when electric power is supplied from the power supply system to said drive force generation portion, and said second electric power allocation ratio such that said first power storage device alone is charged when electric power is supplied from said drive force generation portion to the power supply system.

7. The power supply system according to claim 1, wherein said converter control unit includes a first control unit for controlling said first converter such that a voltage on said power line is adjusted to a prescribed target voltage, and a second control unit for controlling said second converter such that charge and discharge of the second power storage device connected to said second converter is adjusted to a prescribed target amount.

8. The power supply system according to claim 1, wherein said switching device includes a plurality of relays connected between respective ones of said plurality of second power storage devices and said second converter.

9. The power supply system according to claim 1, further comprising a charger for charging said first power storage device and said plurality of second power storage devices upon receiving electric power from a power supply outside the vehicle.

10. A vehicle, comprising:
the power supply system according to claim 1; and
a drive force generation portion for generating drive force of the vehicle upon receiving electric power from said power supply system.

11. A method of controlling a power supply system mounted on a vehicle capable of running while switching between a first running mode of running using electric power stored for running without maintaining said electric power and a second running mode of running while maintaining said electric power at a prescribed target, said power supply system including
a power line for supplying and receiving electric power between a drive force generation portion for generating drive force for running upon receiving electric power from the power supply system and the power supply system,
first and second converters connected in parallel to said power line,
a first rechargeable power storage device connected to said first converter,
a plurality of second rechargeable power storage devices, and
a switching device provided between said plurality of second power storage devices and said second converter, configured to connect any of said plurality of second power storage devices to said second converter in accordance with a provided instruction, the method comprising the steps of:
controlling said switching device such that, when a state quantity indicating a charged state of the second power storage device connected to said second converter is lower than a predetermined value, a remaining second power storage device of which state quantity is not lower than said predetermined value is connected to said second converter;

calculating, based on a remaining electric power amount of each of said first power storage device and said plurality of second power storage devices, a first electric power allocation ratio indicating a ratio of allocation of charge and discharge electric power between said first power storage device and the second power storage device connected to said second converter by means of said switching device, to be used during said first running mode;

calculating, based on a difference between said state quantity in each of said first power storage device and the second power storage device connected to said second converter by means of said switching device and a target value thereof, a second electric power allocation ratio indicating a ratio of allocation of charge and discharge electric power between said first power storage device and the second power storage device connected to said second converter, to be used during said second running mode; and controlling said first and second converters in accordance with said first electric power allocation ratio during said first running mode and controlling said first and second converters in accordance with said second electric power allocation ratio during said second running mode.

12. The method of controlling a power supply system according to claim 11, wherein said target value of said first power storage device is set to said state quantity of said first power storage device attained when transition from said first running mode to said second running mode is made, and said target value of the second power storage device connected to said second converter by means of said switching device is set to said state quantity of said second power storage device attained when transition from said first running mode to said second running mode is made.

13. The method of controlling a power supply system according to claim 11, wherein
in said step of calculating a second electric power allocation ratio, when a first value obtained by subtracting the target value of said state quantity of said first power storage device from said state quantity of said first power storage device has a positive value and a second value obtained by subtracting the target value of said state quantity of the second power storage device connected to said second converter by means of said switching device from said state quantity of the second power storage device has a positive value,
said second electric power allocation ratio is calculated such that said first power storage device and the second power storage device connected to said second converter discharge in accordance with a ratio between said first value and said second value when electric power is supplied from said power supply system to said drive force generation portion, and
said second electric power allocation ratio is calculated such that said first power storage device and the second power storage device connected to said second converter are charged in accordance with an inverse ratio between said first value and said second value when electric power is supplied from said drive force generation portion to said power supply system.

14. The method of controlling a power supply system according to claim 11, wherein
in said step of calculating a second electric power allocation ratio, when a first value obtained by subtracting the target value of said state quantity of said first power storage device from said state quantity of said first power storage device has a negative value and a second value obtained by subtracting the target value of said state quantity of the second power storage device connected to said second converter by means of said switching device from said state quantity of the second power storage device has a negative value,
said second electric power allocation ratio is calculated such that said first power storage device and the second power storage device connected to said second converter are charged in accordance with a ratio between said first value and said second value when electric power is supplied from said drive force generation portion to said power supply system, and
said second electric power allocation ratio is calculated such that said first power storage device and the second power storage device connected to said second converter discharge in accordance with an inverse ratio between said first value and said second value when electric power is supplied from said power supply system to said drive force generation portion.

15. The method of controlling a power supply system according to claim 11, wherein
in said step of calculating a second electric power allocation ratio, when a value obtained by subtracting the target value of said state quantity of said first power storage device from said state quantity of said first power storage device has a positive value and a value obtained by subtracting the target value of said state quantity of the second power storage device connected to said second converter by means of said switching device from said state quantity of the second power storage device has a negative value,
said second electric power allocation ratio is calculated such that said first power storage device alone discharges when electric power is supplied from said power supply system to said drive force generation portion, and
said second electric power allocation ratio is calculated such that the second power storage device alone connected to said second converter is charged when electric power is supplied from said drive force generation portion to said power supply system.

16. The method of controlling a power supply system according to claim 11, wherein
in said step of calculating a second electric power allocation ratio, when a value obtained by subtracting the target value of said state quantity of said first power storage device from said state quantity of said first power storage device has a negative value and a value obtained by subtracting the target value of said state quantity of the second power storage device connected to said second converter by means of said switching device from said state quantity of the second power storage device has a positive value,
said second electric power allocation ratio is calculated such that said second power storage device alone connected to said second converter discharges when electric power is supplied from said power supply system to said drive force generation portion, and
said second electric power allocation ratio is calculated such that said first power storage device alone is charged when electric power is supplied from said drive force generation portion to said power supply system.

17. The method of controlling a power supply system according to claim 11, wherein
in said step of controlling said first and second converters, said first converter is controlled such that a voltage on said power line is adjusted to a prescribed target voltage, and said second converter is controlled such that charge and discharge of the second power storage device connected to said second converter is adjusted to a prescribed target amount.

* * * * *